United States Patent
Tash

(10) Patent No.: US 10,683,958 B1
(45) Date of Patent: Jun. 16, 2020

(54) ADJUSTABLE DRAIN PIPE TEST PLUG FOR ARBITRARY PIPE WALL THICKNESS

(71) Applicant: George Tash, Somis, CA (US)

(72) Inventor: George Tash, Somis, CA (US)

(73) Assignees: George Tash, Somis, CA (US), AS TRUSTEES OF THE COMMUNITY TRUST; Debra Tash, Somis, CA (US), AS TRUSTEES OF THE COMMUNITY TRUST ( * ) Notice: Subject to any disclaimer, the term of this patent is extended or adjusted under 35 U.S.C. 154(b) by 0 days.

(21) Appl. No.: 16/262,663

(22) Filed: Jan. 30, 2019

(51) Int. Cl.
*F16L 55/124* (2006.01)
*F16L 55/105* (2006.01)

(52) U.S. Cl.
CPC ........... *F16L 55/105* (2013.01); *F16L 55/124* (2013.01)

(58) Field of Classification Search
CPC ... F16L 55/105; F16L 55/124; F16L 55/1018; Y10T 137/598; Y10T 137/6123
USPC ........................................ 138/89, 92, 94, 97
See application file for complete search history.

(56) References Cited

U.S. PATENT DOCUMENTS

| | | |
|---|---|---|
| 2,198,854 A | 4/1940 | Behringer |
| 2,327,615 A | 8/1943 | Ankarlo |
| 2,373,242 A | 4/1945 | Glashow |
| 3,019,819 A | 2/1962 | Ankarlo |
| 3,154,106 A | 10/1964 | Ver Nooy |
| 3,626,475 A | 12/1971 | Hicks |
| 3,665,966 A | 5/1972 | Ver Nooy |
| 3,774,646 A | 11/1973 | Smith |
| 4,040,450 A | 8/1977 | Boundy |
| 4,202,377 A | 5/1980 | Harrison |
| 5,082,026 A | 1/1992 | Smith |
| 5,297,581 A | 3/1994 | Godfrey |
| 6,062,262 A | 5/2000 | Tash |
| 6,289,935 B1 | 9/2001 | Tash |
| 8,042,576 B2 * | 10/2011 | Peterson ............... F16L 55/105 138/89 |
| 9,746,088 B2 * | 8/2017 | Odori ........................ F16K 7/20 |

(Continued)

OTHER PUBLICATIONS

GTWater Products, Inc., TTMP Series Test Tee Mechanical Test Plug, Mar. 2014, 1 page.

(Continued)

*Primary Examiner* — Patrick F Brinson
(74) *Attorney, Agent, or Firm* — Lyon & Harr, LLP; Richard T. Lyon

(57) ABSTRACT

An "Adjustable Drainpipe Test Plug Device" (hereinafter "Device") includes a lever arm and a plug seal assembly coupled that lever arm. The plug seal assembly fully or partially mechanically seals the drainpipe when the Device is locked into one of a plurality of plugging positions through a drainpipe side opening. A positioning arm assembly is rotatably coupled to a rear portion of the lever arm to releasably engage the lever arm while a foot of the positioning arm releasably engages a bottom rim of the side opening, thereby locking the Device into plugging position. An adjustable extensible rod of the positioning arm assembly enables the foot to engage the side opening of pipes having different nominal wall thicknesses. The Device may include a through-hole passing from a front side of the plug seal assembly to a rear side, and may include a fluid fill hose sealably coupled to the through-hole.

21 Claims, 10 Drawing Sheets

(56) References Cited

U.S. PATENT DOCUMENTS

2010/0243090 A1* 9/2010 Peterson ............... F16L 55/105
138/90
2018/0252612 A1* 9/2018 Tash ................... G01M 3/2815

OTHER PUBLICATIONS

Oatey Company, Clean-Seal 2 Plug it . . . Fill it . . . Drain it!, http://www.oatey.com/doc/cleanseal2sellsheet1-16art.PDF, Jan. 2016, 1 page.

* cited by examiner

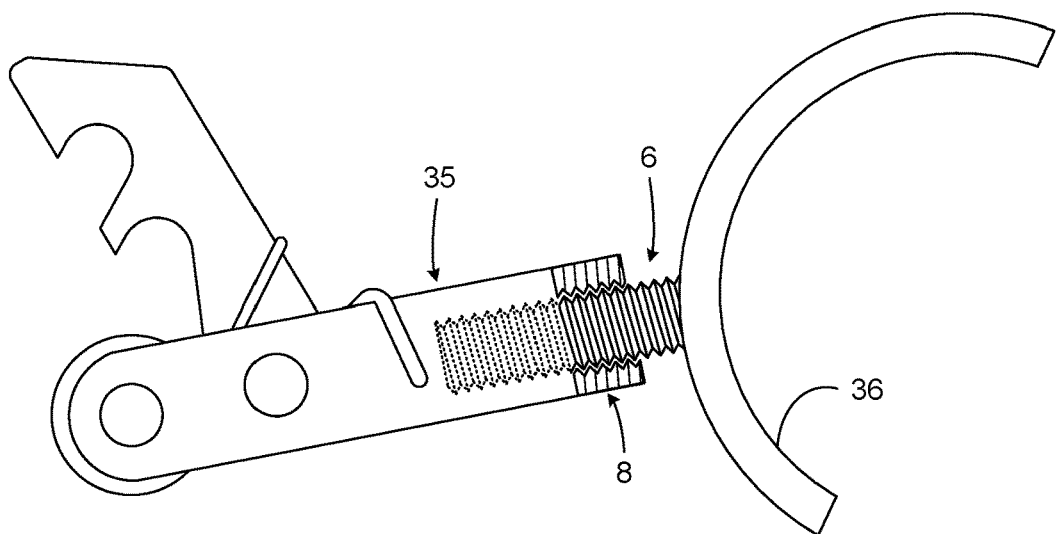
FIG. 3
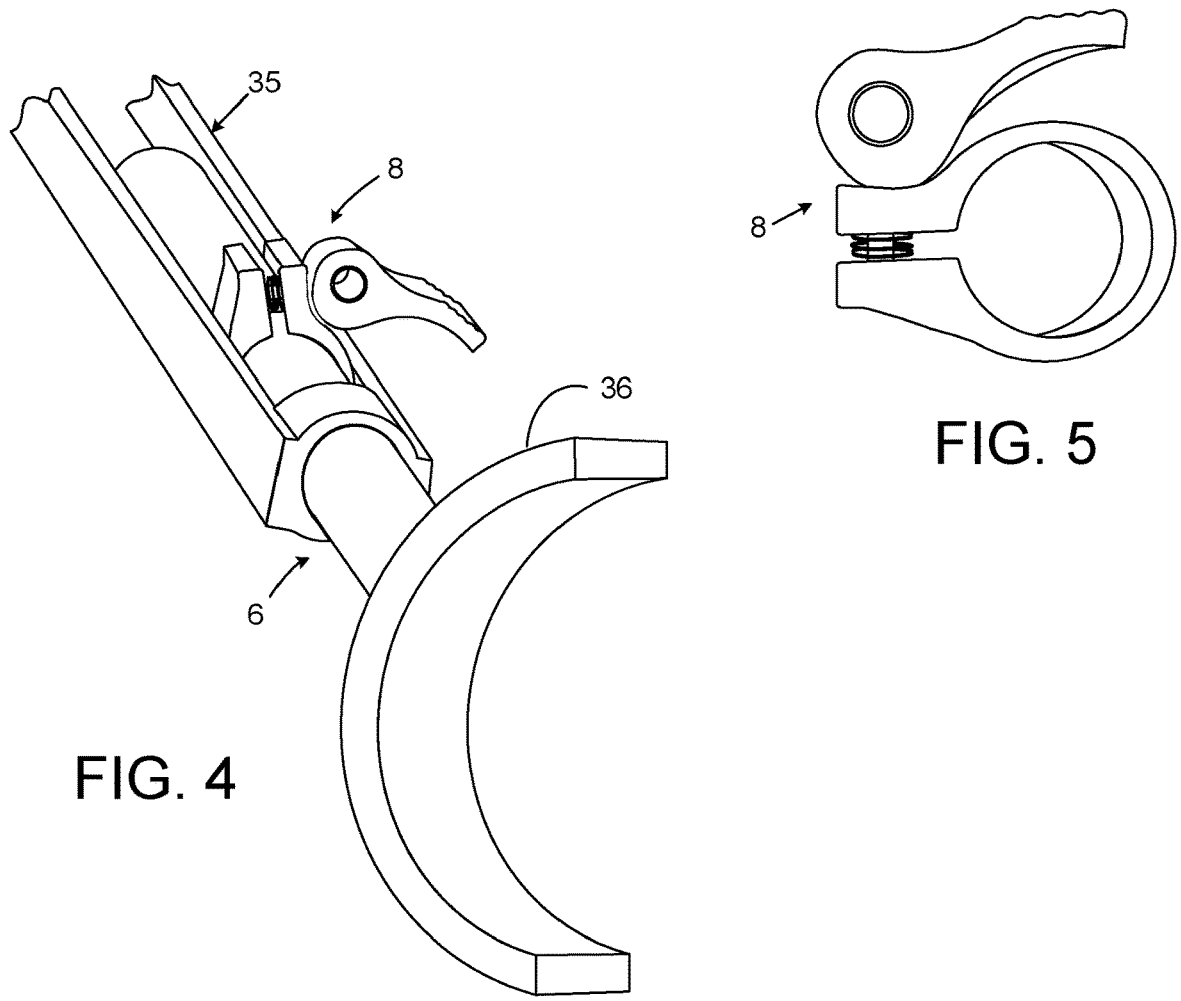
FIG. 5
FIG. 4

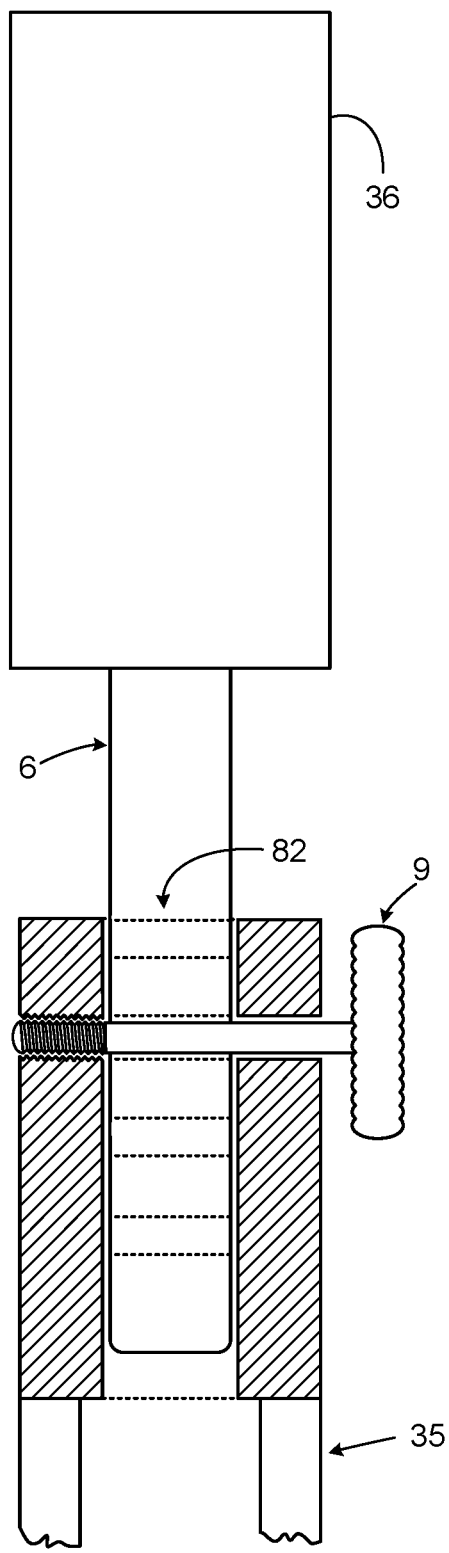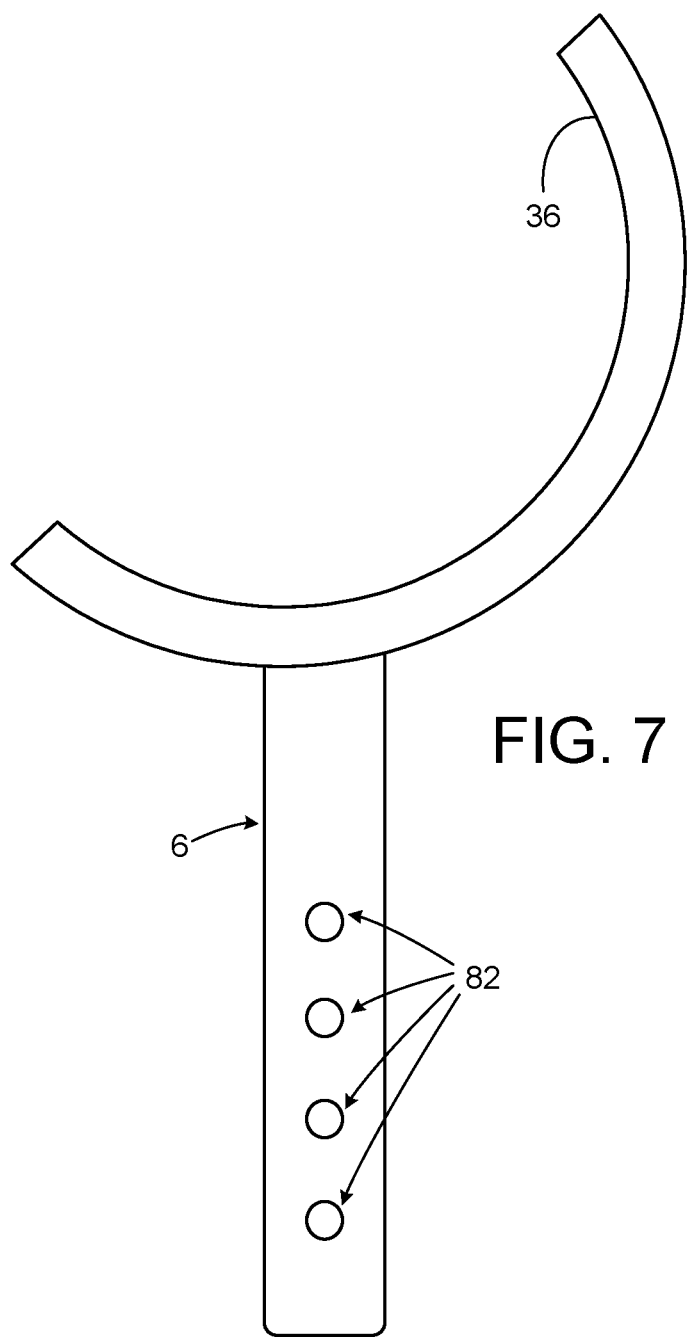
FIG. 6
FIG. 7

ADJUSTABLE DRAIN PIPE TEST PLUG FOR ARBITRARY PIPE WALL THICKNESS

BACKGROUND

Devices for plugging pipes to prevent the flow of water or other fluid are commonly used when testing pipe systems for leaks in homes, apartments or other buildings. When testing for leaks, the main drainpipe in a building is typically sealed or plugged via a side opening or clean-out pipe that is integral or otherwise attached to the main drainpipe that serves the building. The building's drainpipe system is then typically pressurized by filling the system above the plug with water. The pressurized system is then inspected for leaks. Following completion of leak inspections, the device used to seal or plug the drain is removed to drain the water from the pipe system.

SUMMARY

As described herein, an "Adjustable Drainpipe Test Plug Device" (hereinafter sometimes referred as simply the "Device") provides a mechanism for temporarily fully or partially plugging (e.g., sealing) a drainpipe via a side opening that is either integral to or otherwise coupled to the drainpipe. The Adjustable Drainpipe Test Plug Device includes a lever arm having front and rear portions and a plug seal assembly securely coupled to a front portion of the lever arm. The plug seal assembly includes a plug designed to fully or partially mechanically seal the drainpipe when the Adjustable Drainpipe Test Plug Device is locked into one of a plurality of desired plugging positions within the drainpipe. The Adjustable Drainpipe Test Plug Device further includes a positioning arm assembly rotatably coupled to the rear portion of the lever arm. The positioning arm further includes an extensible rod, or the like, having a foot, or other coupling means or member, configured to releasably engage with a bottom rim of the side opening of the drainpipe. In operation, a length of the extensible rod is adjusted relative to the positioning arm to securely and releasably lock the Adjustable Drainpipe Test Plug Device into the desired plugging position. Advantageously, the adjustable extensible rod, or the like, enables the foot, or other coupling means, to securely engage the side opening of a wide range of pipes having different nominal wall thicknesses. In general, as the nominal wall thickness increases, the length of the extensible rod used to releasably engage with the bottom rim of the side opening of the drainpipe will be decreased. Conversely, as the nominal wall thickness decreases, the length of the extensible rod used to releasably engage with the bottom rim of the side opening of the drainpipe will be increased. In various implementations, the plug device further includes an optional sealable through-hole passing from a front side of the plug seal assembly to a rear side thereof. In various implementations, the plug device includes a fluid fill hose sealably coupled to the through-hole.

The Adjustable Drainpipe Test Plug Device provides various implementations and methods for testing the drainpipe. In an exemplary implementation such methods includes the following actions. The extensible rod of the Adjustable Drainpipe Test Plug Device is adjusted relative to the positioning arm to account for a nominal wall thickness of the drainpipe being tested. This extensible rod improves compatibility of the Adjustable Drainpipe Test Plug Device with the different pipe wall thicknesses known to be associated with different pipe Schedules (e.g., Schedule 40 vs. Schedule 80 PVC pipe) for a particular Nominal Pipe Size (NPS) (e.g., outer pipe diameter). Next, the Adjustable Drainpipe Test Plug Device is inserted into the drainpipe via the side opening. In various implementations, the Adjustable Drainpipe Test Plug Device is then locked into the plugging position, thus causing the plug to fully or partially mechanically seal the drainpipe. In other words, the Adjustable Drainpipe Test Plug Device may be locked into either a full plugging position (e.g., fully preventing flow through the pipe) or a partial plugging position (e.g., partially preventing flow through the pipe).

In various implementations, the optional through-hole that passes from a front side of the plug to the rear side thereof also includes a fluid fill hose, one end of which is removably coupled to the through-hole. This fill hose is applied for various purposes, including, but not limiting to, filling the drainpipe with fluid when the Adjustable Drainpipe Test Plug Device is locked into a sealing position within the drainpipe, testing a pressure within the drainpipe via an optional pressure gauge coupled to either the fill hose or directly to the through-hole, etc. In various implementations, the hose further includes a shut-off valve assembly which includes at least a valve portion and a valve control lever or other valve actuating mechanism for opening and closing the valve. In operation, a test fluid supply source may then be then sealably coupled to an outboard side of the shut-off valve assembly. The valve is then placed in its open position, thus allowing the test fluid supplied by the test fluid supply source to flow through the hose and the through-hole, and into the drainpipe above the plug. It is then determined if a desired amount of the test fluid has flowed into the drainpipe above the plug. Whenever the desired amount of the test fluid has flowed into the drainpipe above the plug, the valve is placed in its closed position, thus stopping the flow of the test fluid into the drainpipe, and preventing the test fluid within the drainpipe from leaking out of the drainpipe via the hose. In addition, closing of the valve serves to maintain pressurization of the drainpipe above the plug due to back pressure caused by the test fluid existing within the drainpipe. The pressurized drainpipe may then be monitored for leaks for a prescribed amount of time. Whenever the monitoring of the pressurized drainpipe has been completed, the test fluid may be drained from the drainpipe.

It is noted that the foregoing Summary is provided to introduce a selection of concepts, in a simplified form, that are further described below in the Detailed Description. This Summary does not identify key features or essential features of the claimed subject matter, nor is it intended to be used as an aid in determining the scope of the claimed subject matter. Its sole purpose is to present some concepts of the claimed subject matter in a simplified form as a prelude to the more-detailed description that is presented below.

DESCRIPTION OF THE DRAWINGS

The specific features, aspects, and advantages of the Adjustable Drainpipe Test Plug Device implementations described herein will become better understood with regard to the following description, appended claims, and accompanying drawings where:

FIG. 3 is a diagram illustrating a partially-transparent side plan view, in simplified form, of an exemplary implementation of the positioning arm having an extensible threaded rod coupled.

FIG. 4 is a diagram illustrating a perspective view, in simplified form, of a portion of an exemplary implementation of the positioning arm having an extensible rod coupled secured relative to the positioning arm via a cam-lock type device.

FIG. 5 is a diagram illustrating a perspective view, in simplified form, of a portion of the cam-lock type device of FIG. 4.

FIG. 6 is a diagram illustrating a partially-transparent rear plan view, in simplified form, of an exemplary implementation of a portion of the positioning arm having an extensible rod coupled to the positioning arm via a removable threaded pin.

FIG. 7 is a diagram illustrating a partially-transparent side plan view, in simplified form, of an exemplary implementation of the extensible rod of FIG. 6, showing holes for accepting the threaded pin to releasably lock the extensible rod into a desired position relative to the positioning arm.

DETAILED DESCRIPTION

Figure 1:
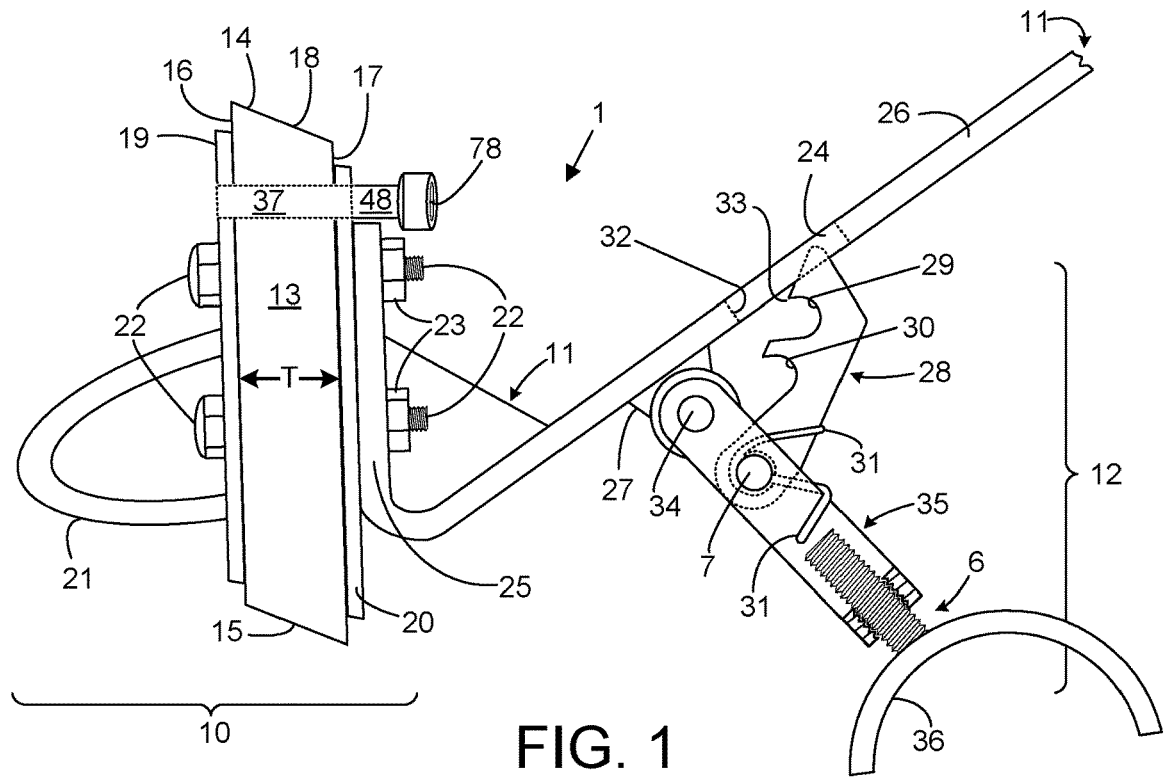
FIG. 1 is a diagram illustrating a partially-transparent side plan view, in simplified form, of an exemplary implementation of an Adjustable Drainpipe Test Plug Device having an extensible rod coupled to a positioning arm.

In the following description of an "Adjustable Drainpipe Test Plug Device" (hereinafter sometimes referred as simply the "Device"), reference is made to the accompanying drawings which form a part hereof, and in which are shown, by way of illustration, specific implementations in which the Device can be realized. It is understood that other implementations can be utilized and structural changes can be made without departing from the intended scope of the various Adjustable Drainpipe Test Plug Device implementations.

It is also noted that for the sake of clarity specific terminology will be resorted to in describing the Adjustable Drainpipe Test Plug Device implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "one version", or "another version", or an "exemplary version", or an "alternate version", or "one variant", or "another variant", or an "exemplary variant", or an "alternate variant" means that a particular feature, a particular structure, or particular characteristics described in connection with the implementation/version/variant can be included in at least one implementation of the Adjustable Drainpipe Test Plug Device. The appearances of the phrases "in one implementation", "in another implementation", "in an exemplary implementation", "in an alternate implementation", "in one version", "in another version", "in an exemplary version", "in an alternate version", "in one variant", "in another variant", "in an exemplary variant", and "in an alternate variant" in various places in the specification are not necessarily all referring to the same implementation/version/variant, nor are separate or alternative implementations/versions/variants mutually exclusive of other implementations/versions/variants. Furthermore, the order of method flow representing one or more implementations, or versions, or variants of the Adjustable Drainpipe Test Plug Device does not inherently indicate any particular order nor imply any limitations of the Device.

Furthermore, to the extent that the terms "includes," "including," "has," "contains," variants thereof, and other similar words are used in either this detailed description or the claims, these terms are intended to be inclusive, in a manner similar to the term "comprising", as an open transition word without precluding any additional or other elements.

1.0 Brief Discussion of Pipe Wall Thickness:

In general, as is well known to those skilled in the art, industry standard Nominal Pipe Size (NPS) charts describe physical dimensions and weights of standardized pipes of various materials (e.g., PVC, iron, steel, copper, etc.). These NPS charts typically include a wall thickness measure for each pipe in combination with both interior and exterior pipe diameters. For example, a 2-inch NPS pipe has a nominal outside diameter (OD) of 2.375 inches, while the inside diameter (ID) varies based the pipe Schedule (e.g., relating to the nominal pressure rating) of the pipe. For a given NPS pipe, the nominal OD does not change. Consequently, as the pipe Schedule increases or decreases, the outside diameter remains constant, while the inside diameter, and thus the pipe wall thickness, varies based on the pipe Schedule. For instance, a 2-inch NPS pipe has a nominal OD of 2.375 inches, regardless of Schedule. However, the nominal wall thickness of a "Schedule 10" 2-inch NPS pipe is 0.109 inches, while the nominal wall thickness of a "Schedule 40" 2-inch NPS pipe is 0.218 inches. Such concepts relating to nominal pipe wall thickness and pipe ID as a function of pipe Schedule are well known to those skilled in the art and will not be described in further detail herein.

As mentioned, the Adjustable Drainpipe Test Plug Device implementations described herein include an adjustable or extensible rod (e.g., an extendable and retractable rod or the like secured to the Device via an adjustable coupling mechanism, as described in further detail herein). Advantageously, the adjustability of this rod (also including shafts, tubes, bars, flat stock, etc.) improves the interoperability of Adjustable Drainpipe Test Plug Device with respect to pipe walls of different thicknesses of particular NPS pipes. As described in further detail herein, this rod includes a foot, or other coupling means or member, that enables the Adjustable Drainpipe Test Plug Device to securely engage with a pipe opening (e.g., a conventional drain clean-out port or other pipe opening) when a length of the rod, relative to a pivot arm of the Device, is adjusted to securely interface with a particular NPS pipe having a particular nominal wall thickness. In general, as the nominal wall thickness increases, the length of the extensible rod used to releasably engage with the bottom rim of the side opening of the drainpipe will be decreased. Conversely, as the nominal wall thickness decreases, the length of the extensible rod used to releasably engage with the bottom rim of the side opening of the drainpipe will be increased.

2.0 Adjustable Drainpipe Test Plug Device:

The Adjustable Drainpipe Test Plug Device implementations described herein generally involve a device for fully or partially temporarily plugging (e.g., sealing) a drainpipe via an opening that is formed therein. In other words, the Adjustable Drainpipe Test Plug Device may be locked into either a full plugging position (e.g., fully preventing flow through the pipe) or a partial plugging position (e.g., partially preventing flow through the pipe, also referred to as a "fluid bleeding" position). As will be appreciated from the more detailed description that follows, the just-described opening can take various forms. For example, such openings include, but are not limited to, openings that are formed by a conventional drain clean-out port that is integral to or otherwise coupled or fitted into the drainpipe to be plugged or the drainpipe system to be tested. It is noted that the opening can also be any other type of substantially circular side opening of sufficient size that is coupled to or integral to the drainpipe to be plugged or the drainpipe system to be tested. Various Adjustable Drainpipe Test Plug Device implementations also generally involve use of the Device in combination with various methods for testing the drainpipe. The term "drainpipe" is used herein to refer to a series of pipes that is interconnected via various types of fittings to form a drainpipe system in a building or any other type of facility. This drainpipe system may be connected to a sewer system, though such sewer system connection is not specifically relevant to the design or functionality of various implementations of the Adjustable Drainpipe Test Plug Device.

The Adjustable Drainpipe Test Plug Device implementations described herein are advantageous for various reasons including, but not limited to, the following. As will be appreciated from the foregoing and the more-detailed description that follows, the Adjustable Drainpipe Test Plug Device implementations are adaptable to pipes having different nominal wall thicknesses. The Adjustable Drainpipe Test Plug Device implementations can be used to temporarily prevent (e.g., block) the flow of some or all fluid in a drainpipe. The Adjustable Drainpipe Test Plug Device implementations can also be used to pressurize a drainpipe with a prescribed fluid (such as water or any other desired type of fluid) or a prescribed gas (such as air or any other desired type of gas). It will be appreciated that the pressure in a drainpipe that is filled with fluid increases in direct proportion to the height of the fluid in the drainpipe. Consequently, any device that is used to plug a drainpipe in a building, where the drainpipe is filled with fluid, generally has to withstand an increasing amount of back pressure as the height of the building increases. The Adjustable Drainpipe Test Plug Device implementations can also be used to temporarily plug drainpipes in buildings of any height and will maintain a mechanical seal created by this plugging when exposed to back pressure from fluid levels of any height, and for any desired length of time, without bleeding or leakage past the Adjustable Drainpipe Test Plug Device. In other words, the Adjustable Drainpipe Test Plug Device implementations can maintain a mechanical seal in a drainpipe for long periods of time when exposed to a wide range of pressures in the drainpipe.

The Adjustable Drainpipe Test Plug Device implementations described herein can also be easily inserted through the aforementioned opening and into a drainpipe, and easily and reliably positioned (e.g., maneuvered) within the drainpipe in order to plug it for testing, without damaging the drainpipe or the opening. Once this testing is completed the Adjustable Drainpipe Test Plug Device implementations can be easily withdrawn from the drainpipe and the opening in order to unplug the drainpipe, again without damaging the drainpipe or the opening. In the case where the opening is formed by the aforementioned drain clean-out port and a short length of clean-out pipe extends from this port, the Adjustable Drainpipe Test Plug Device implementations can be easily inserted through this clean-out pipe and into the drainpipe, and then easily withdrawn from the drainpipe and the clean-out pipe, regardless of the angle at which the clean-out pipe is oriented with respect to the drainpipe (e.g., a 45-degree angle, a 90-degree angle, or any other angle).

The Adjustable Drainpipe Test Plug Device implementations described herein are also simple, easy to use, durable, inexpensive, compact, light in weight and can be safely operated by a single user. The term "user" is applied herein to refer to a person who utilizes the Adjustable Drainpipe Test Plug Device implementations to temporarily plug a drainpipe that may be part of a drainpipe system, and then to optionally test the drainpipe system for leaks. Accordingly, a user can be thought of as an operator of the Adjustable Drainpipe Test Plug Device implementations. The Adjustable Drainpipe Test Plug Device implementations can also be adapted for use in a wide range of drainpipe sizes (e.g., internal diameters). The Adjustable Drainpipe Test Plug Device implementations can also be easily and inexpensively fabricated using a variety of inexpensive but durable materials, some examples of which are described in more detail hereafter.

Figure 17:
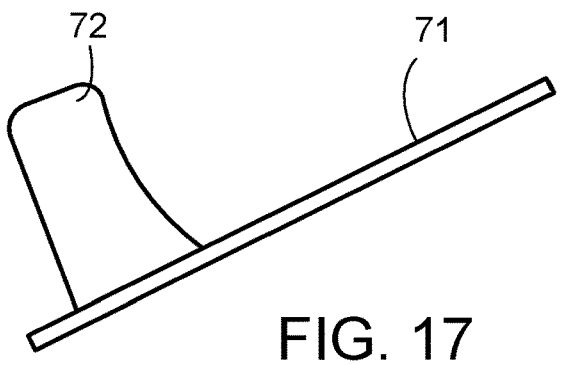
FIG. 17 is a diagram illustrating a side plan view, in simplified form, of an alternate implementation of a front pressure plate of the Adjustable Drainpipe Test Plug Device of FIG. 1.
Figure 18:
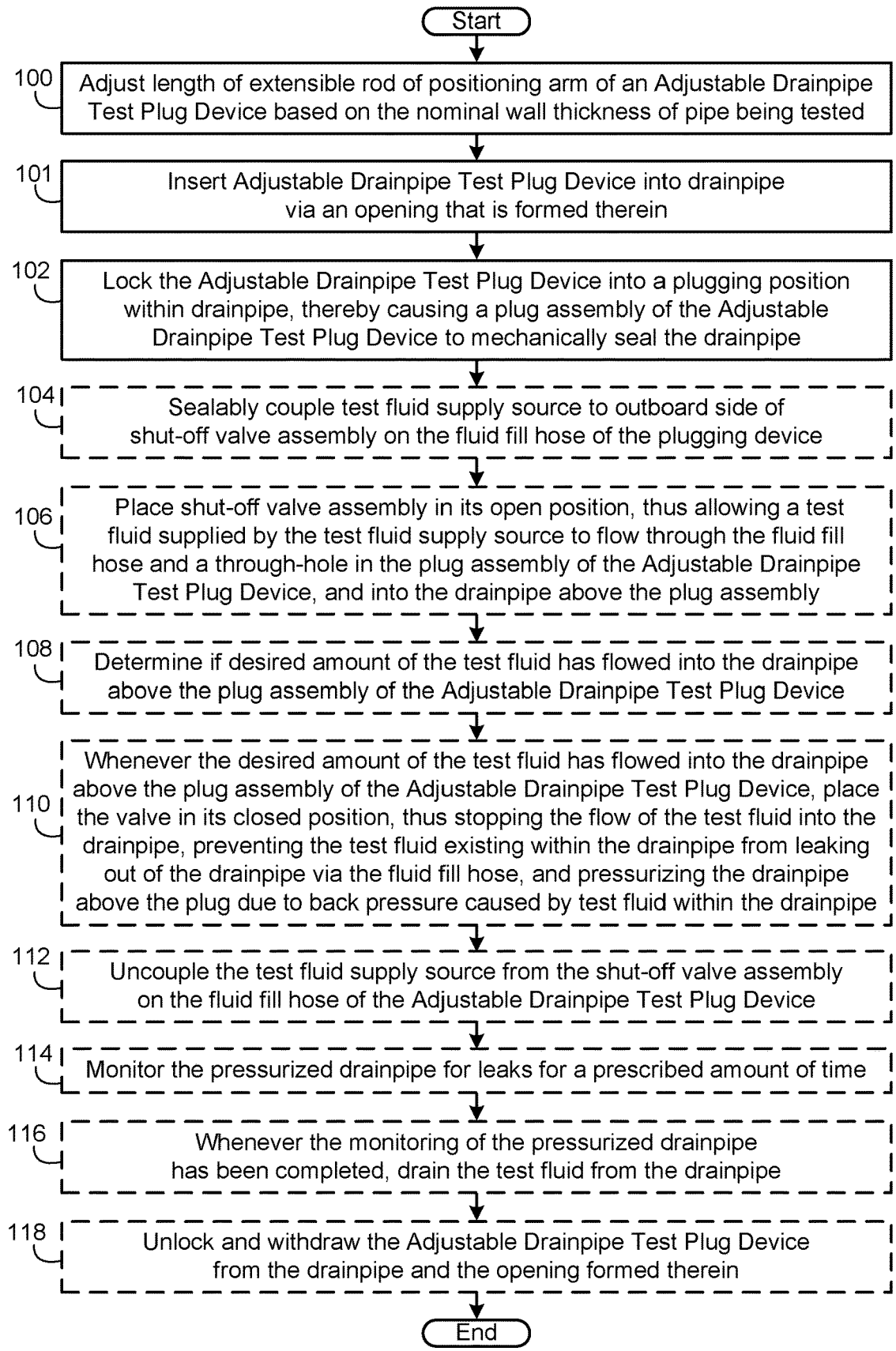
FIG. 18 provides a flow diagram illustrating an exemplary implementation, in simplified form, of a method for testing a drainpipe using one or more of the Adjustable Drainpipe Test Plug Device implementations described herein.

2.1 Components of the Adjustable Drainpipe Test Plug Device:

Various physical components and implementations of the Adjustable Drainpipe Test Plug Device are described with respect to FIG. 1 through FIG. 17, while FIG. 18 illustrates an exemplary method for use of the Adjustable Drainpipe Test Plug Device. FIG. 1 through FIG. 18 are not intended to provide an exhaustive representation of all of the various possible components and implementations of the Adjustable Drainpipe Test Plug Device described herein, and these figures are provided only for purposes of explanation. Further, any components and interconnections between such components of the Adjustable Drainpipe Test Plug Device may be implemented using any desired materials, and component sizes, shapes, and interfaces, that are sufficient to achieve the functionality described herein. Further, some of the components of the Adjustable Drainpipe Test Plug Device may be described as optional or alternate implementations. Any or all such optional or alternate implementations or components may be used in combination with other any of the components or implementations, optional or otherwise, that are described throughout this document.

Figure 2:
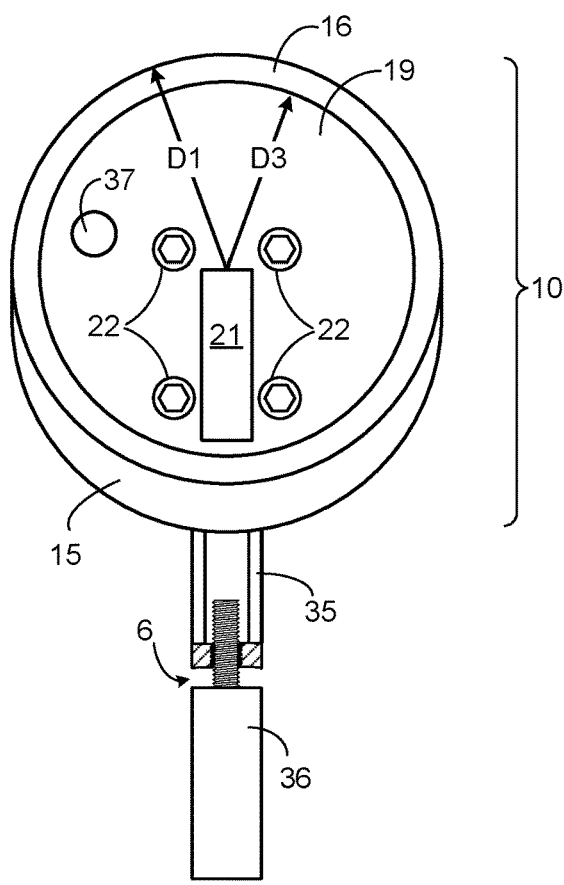
FIG. 2 is a diagram illustrating a plan view, in simplified form, of the Adjustable Drainpipe Test Plug Device of FIG. 1 rotated right 90 degrees.
Figure 8:
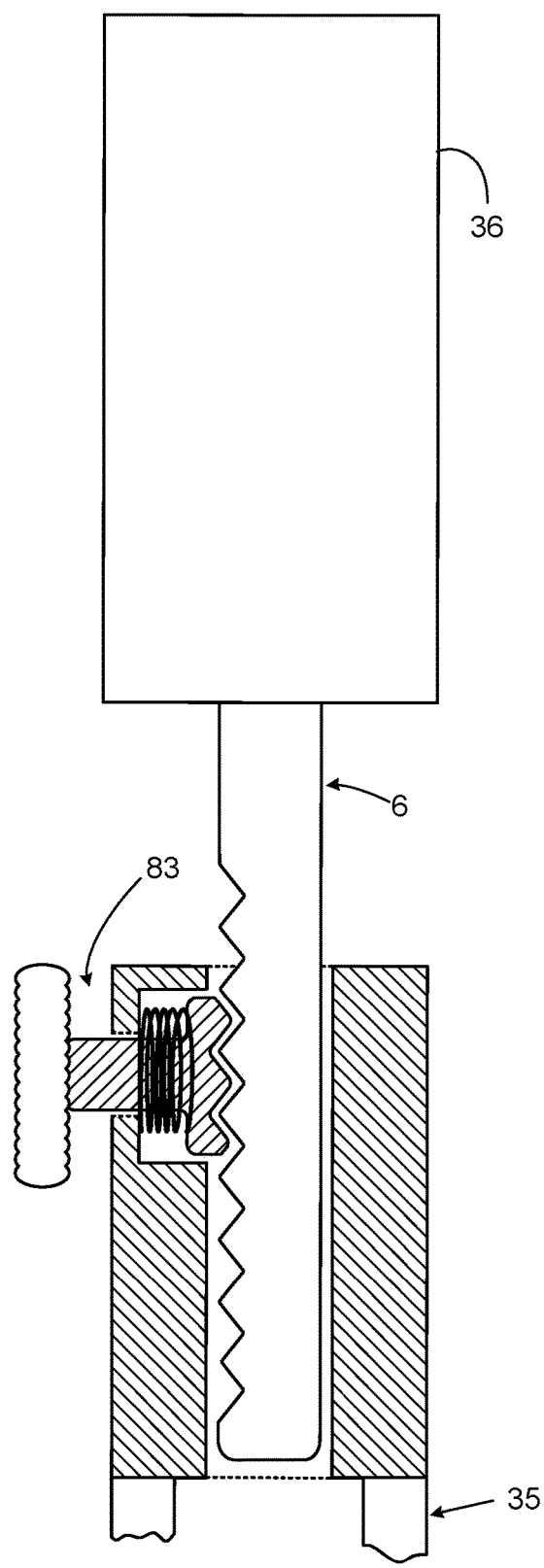
FIG. 8 is a diagram illustrating a partially-transparent rear plan view, in simplified form, of an exemplary implementation of a portion of the positioning arm having an extensible rod coupled to the positioning arm via a spring-lock mechanism.
Figure 9:
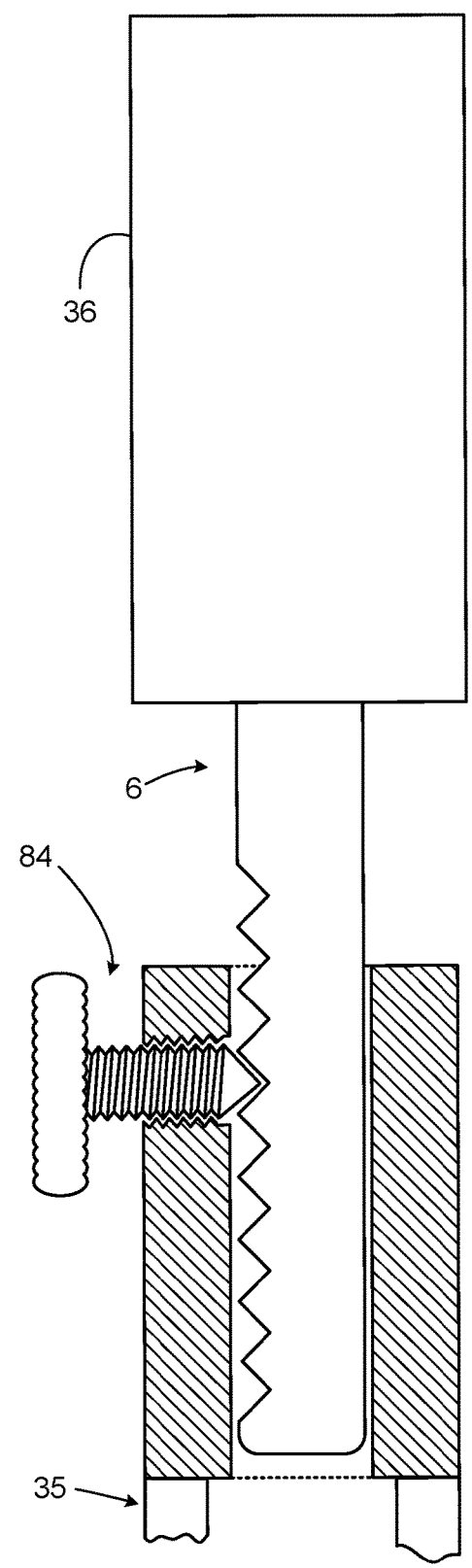
FIG. 9 is a diagram illustrating a partially-transparent rear plan view, in simplified form, of an exemplary implementation of a portion of the positioning arm having an extensible rod coupled to the positioning arm via a set screw mechanism.

FIG. 1 illustrates a partially-transparent side plan view, in simplified form, of an exemplary implementation of the Adjustable Drainpipe Test Plug Device 1. FIG. 2 illustrates a plan view, in simplified form, of the Adjustable Drainpipe Test Plug Device of FIG. 1 rotated right 90 degrees. As exemplified in FIG. 1, the Adjustable Drainpipe Test Plug Device 1 includes a lever arm 11 (shown partially), a plug seal assembly 10, a positioning arm assembly 12, and an optional through-hole 37 (shown with optional attached fluid attachment nipple 48 and with hose connector 78). The lever arm 11 can be used for various purposes. By way of example but not limitation, and as will be described in more detail hereafter, the lever arm 11 may be used to insert the Device 1 through an opening that is formed in a drainpipe (not shown in FIG. 1 or 2, but shown in FIGS. 14-16) that is being tested. The lever arm 11 may also be used to position the Device 1 within the drainpipe (e.g., see FIG. 14) and then lock the Device into a plugging position within the drainpipe in order to plug it for testing. As will be appreciated from the detailed description that follows, when the Device 1 is in this plugging position (e.g., see FIG. 14) a plug 13 of the plug seal assembly 10 illustrated by FIG. 1 mechanically seals the drainpipe. Note that for purposes of clarity, lever arm 11 is not visible in FIG. 2.

Once the testing of the drainpipe has been completed, the lever arm 11 may also be used to unlock the Device 1 from the plugging position and then lock that Device into a test fluid bleeding position (e.g., see FIG. 16) within the drainpipe in order to allow a test fluid that was introduced into the drainpipe above the Device 1 via an optional fluid fill hose (not shown in FIG. 1 or FIG. 2) to drain out of the drainpipe without the test fluid flowing or splashing out of the opening. As will be described in more detail hereafter, rather than locking the Device 1 into the just-described test fluid bleeding position within the drainpipe, the Device 1 may also be left in its plugging position within the drainpipe and the optional fluid fill hose can optionally be used to drain the test fluid out of the drainpipe, again without the test fluid flowing or splashing out of the opening. Once the testing of the drainpipe has been completed and the test fluid has been drained out of the drainpipe, the lever arm 11 may also be used to withdraw the Device 1 from the drainpipe and the opening. If desired, the opening in the drainpipe may then be capped.

Referring again to FIGS. 1 and 2, the lever arm 11 (not visible in FIG. 2) is generally L-shaped and includes a front portion 25 and a rear portion 26, where the front portion 25 is substantially shorter than the rear portion 26. The plug seal assembly 10 includes the aforementioned plug 13, a front pressure plate 19, and a rear pressure plate 20. The plug 13 has a prescribed thickness T, a prescribed axial diameter D1, and a prescribed axially cross-sectional shape that are adapted to allow the plug 13 to form a mechanical seal with the interior wall of the particular drainpipe that is being plugged by the Adjustable Drainpipe Test Plug Device 1 when the plug 13 is in the aforementioned plugging position within the drainpipe. In other words, the plug 13 has a thickness T, axial diameter D1, and axially cross-sectional shape that are designed to allow the plug 13 to seat fully and securely within the interior of the drainpipe and completely plug it for testing (e.g., see FIG. 15). As such, the plug 13 may have various thicknesses T and various diameters D1. Since the conventional drainpipes that are employed in conventional drainpipe systems are commonly circular, in tested implementations of the Device 1 the axially cross-sectional shape of the plug 13 was substantially circular as shown in FIG. 2. However, it is noted that alternate implementations of the plug 13 are also possible where the axially cross-sectional shape thereof is any circular or non-circular shape designed to fit within any particular shape of pipe.

Figure 14:
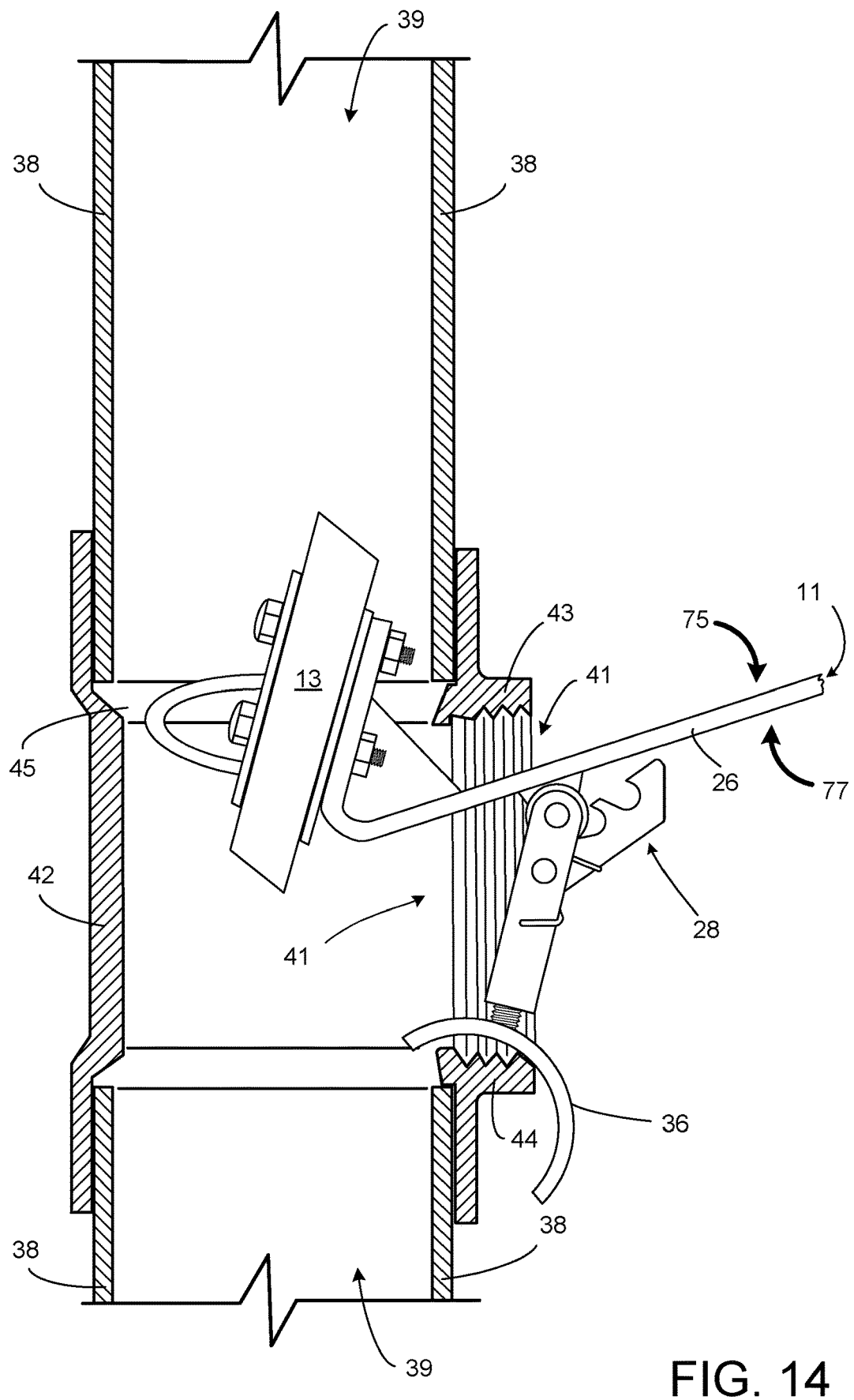
FIG. 14 is a diagram illustrating a partially-cross-sectional side plan view, in simplified form, of the Adjustable Drainpipe Test Plug Device of FIG. 1 while it is being inserted into a drainpipe through an opening that is formed in the drainpipe. It is noted that the optional fluid fill hose of the Adjustable Drainpipe Test Plug Device is not shown in this diagram for convenience.
Figure 15:
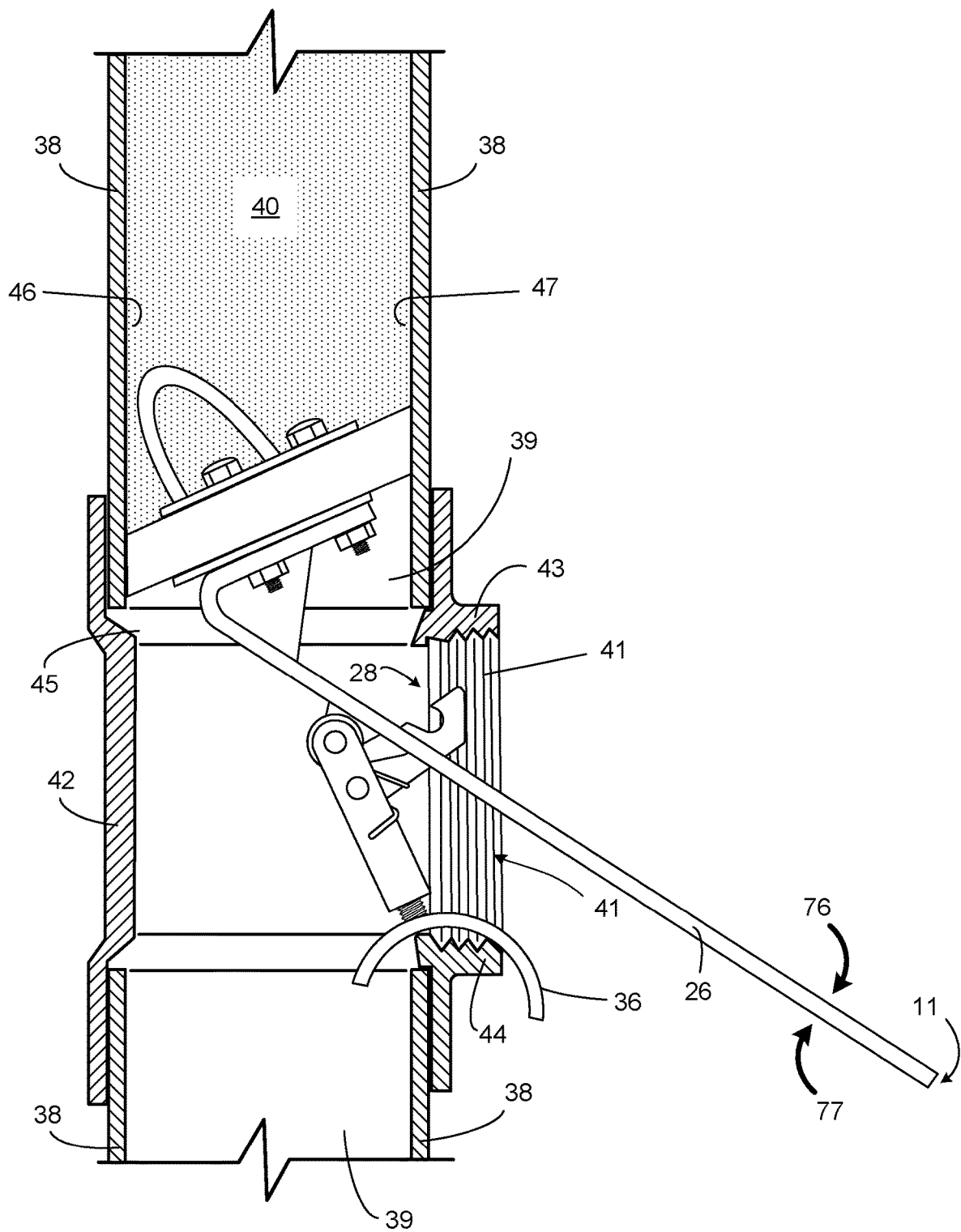
FIG. 15 is a diagram illustrating a partially-cross-sectional side plan view, in simplified form, of the Adjustable Drainpipe Test Plug Device of FIG. 1 while it is fully seated and locked into a plugging position within the drainpipe, and after a test fluid has been introduced into the drainpipe, so that the Device is completely plugging the drainpipe immediately above the opening therein and temporarily preventing the test fluid from flowing beyond the Device.
Figure 16:
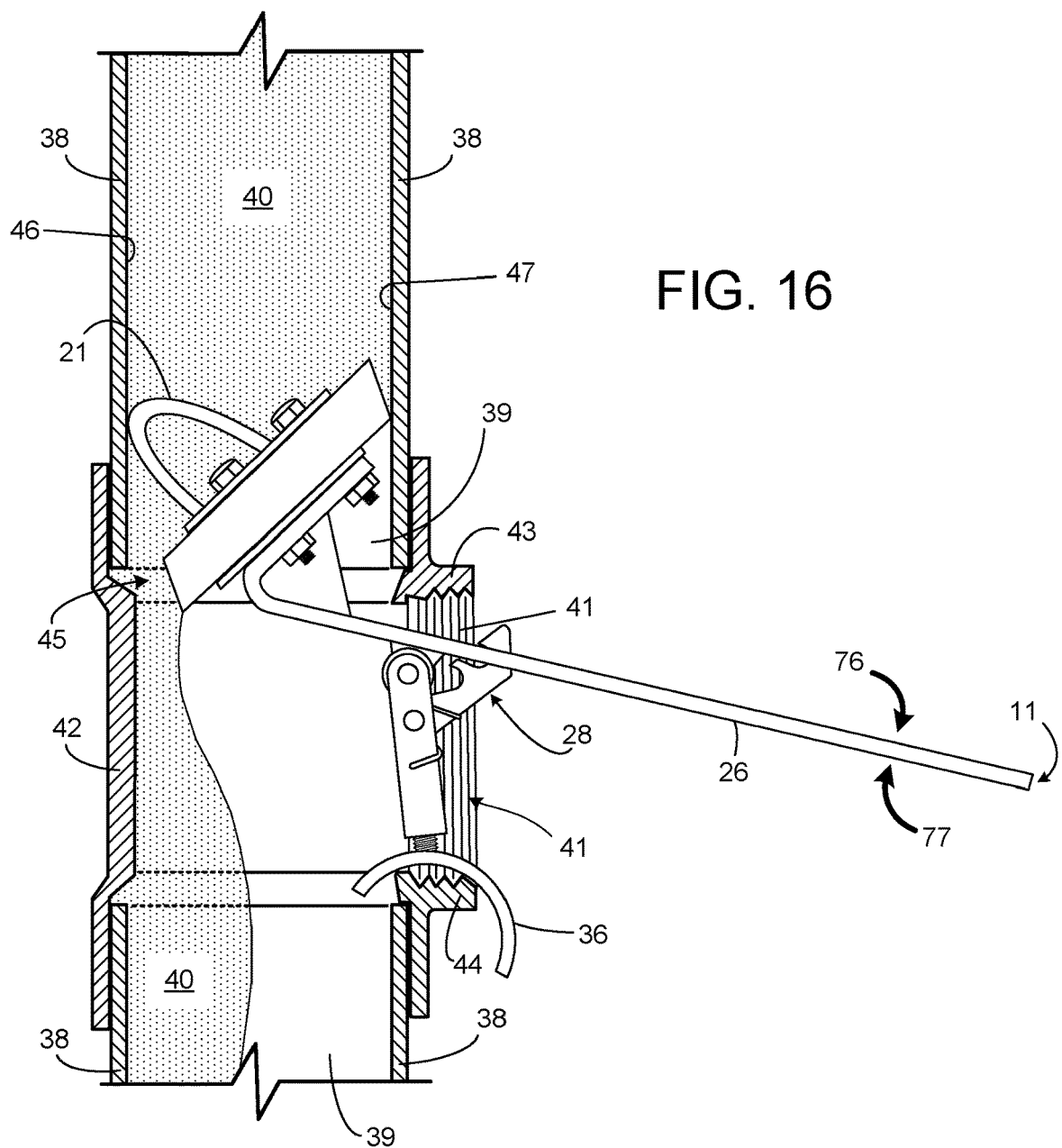
FIG. 16 is a diagram illustrating a partially-cross-sectional side plan view, in simplified form, of the Adjustable Drainpipe Test Plug Device of FIG. 1 while it is locked into a test fluid bleeding position within the drainpipe, so that the Device is allowing the test fluid to slowly flow past the Device and drain out of the drainpipe.

Although planer surfaces are not required, in the implementation illustrated by FIG. 1 and FIG. 2, the plug 13 has a planar front surface 16, a planar rear surface 17 that is substantially parallel to the front surface 16, and a peripheral annular rim 18 (e.g., a peripheral edge surface). The annular rim 18 has a leading/top end 14 and a trailing/bottom end 15. The leading/top end 14 of the rim 18 slopes rearwardly and downwardly (e.g., at an angle of less than 90 degrees with respect to the front surface 16), and the trailing/bottom end 15 of the rim 18 is approximately parallel to the leading/top end 14 as shown in FIG. 1, though variation in the parallelism will not affect performance of the plug 13, depending upon factors such as flexibility and compressibility of the material forming that plug. Accordingly, the plug 13 in side elevation has the shape of a parallelogram as shown in FIG. 1, and also shown in FIGS. 14-16. As shown in FIGS. 14-16 and as will be described in more detail hereafter, this particular configuration of the plug 13 optimally facilitates the positioning/maneuvering of the plug 13 into and out of the plugging position within the drainpipe. The angle of the rim 18 with respect to the front and rear surfaces 16 and 17 of the plug 13 can be any suitable angle that facilitates the plug seating, sealing and fluid draining functions described herein. For example, in tested implementations of the Device 1, the leading/top end 14 of the rim 18 sloped at an angle of approximately 65-70 degrees with respect to the front surface 16 of the plug 13.

Referring again to FIGS. 1 and 2, the front pressure plate 19 has a shape that is substantially the same as the axially cross-sectional shape of the plug 13, and has a diameter D3 that is less than the axial diameter D1 of the plug 13. The rear pressure plate 20 also has a shape that is substantially the same as the axially cross-sectional shape of the plug 13, and has a diameter (not shown) that is also less than the axial diameter D1 of the plug 13. The front pressure plate 19 is centrally disposed onto the front surface 16 of the plug 13, and the rear pressure plate 20 is centrally disposed onto the rear surface 17 of the plug 13. Accordingly, the plug 13 is centrally sandwiched between the front and rear pressure plates 19 and 20. The plug seal assembly 10 is securely coupled to the front portion 25 of the lever arm 11 using a prescribed number of spaced bolts 22 or other fasteners and the same number of nuts 23, where the shaft of each of the bolts 22 or other fasteners passes completely through the plate 19, the plug 13, the plate 20, and the front portion 25 of the lever arm 11, each of the nuts 23 is adapted to threadably fasten onto a different one of the bolts 22. Clearly, other fasteners and other fastening mechanisms (e.g., rivets, adhesives, screws, etc.) may also be applied to securely couple the plug seal assembly 10 to the front portion 25 of the lever arm 11.

As shown in FIG. 1 the bolts 22 and nuts 23 operate to join the front pressure plate 19, the plug 13, the rear pressure plate 20, and the front portion 25 of the lever arm 11 together such that the plug 13 is compressed between the plates 19/20 and assumes the same angular position as the front portion 25 of the lever arm 11. It will be appreciated that the plug 13 can be changed out to another plug having a different size that is suited to plugging a different drainpipe (e.g., a drainpipe whose interior passageway has a different diameter, or a different cross-sectional shape, or both a different diameter and a different cross-sectional shape) by removing the nuts 23 from the bolts 22 and using them 23/22 to install the differently sized and/or shaped plug into the plug seal assembly 10.

Referring again to FIGS. 1 and 2, the plug seal assembly 10 also includes an optional through-hole 37 that passes from the front side (i.e., the left side from the perspective of FIG. 1) of the plug seal assembly 10 to the rear side (i.e., the right side from the perspective of FIG. 1) of the plug seal assembly 10. As will be described in more detail hereafter, this through-hole 37 allows fluids and gases to flow through the plug seal assembly 10 into and out of the drainpipe that is being tested in a controlled manner. As will also be described in more detail hereafter, one end of the aforementioned fluid fill hose can be sealably coupled to the through-hole 37 and the other end of the fluid fill hose can be sealably coupled to a test fluid supply source, where this coupling can be realized in various ways.

For example, in one implementation of the Adjustable Drainpipe Test Plug Device 1 the rear side of the optional through-hole 37 (i.e., the side of the plug seal assembly 10 that the front portion 25 of the lever arm 11 is securely coupled to) includes a fluid attachment nipple 48 to which one end of certain implementations of the fluid fill hose (and/or a pressure gauge or a sealing mechanism) can be sealably coupled. In one version of the just-described Adjustable Drainpipe Test Plug Device implementation the exterior surface of the rear end 78 of the nipple 48 is threaded to form a threaded male connector. Alternately, the interior surface of the rear end 78 of the nipple 48 can be threaded to form a threaded female connector. In another version of this implementation, the rear end 78 of the nipple 48 forms a quick-disconnect type male or female connector. In another implementation of the Device 1 where the rear side of the through-hole 37 does not include the attachment nipple 48, one end of certain other implementations of the fluid fill hose can be sealably coupled to the through-hole 37 by inserting this end directly into the through-hole 37.

Referring again to FIGS. 1 and 2, in one implementation of the Adjustable Drainpipe Test Plug Device 1 the front pressure plate 19 can optionally include an spacing hoop 21 that is rigidly disposed onto the front surface of the plate 19 and extends forwardly thereof, where this spacing hoop 21 has any desired size and shape that help to accurately position the plug assembly 10 within the drainpipe that is being tested as the plug assembly 10 is being rotated upward within the drainpipe's interior passageway (e.g., see FIG. 16). In another implementation of the Adjustable Drainpipe Test Plug Device (not shown) the front pressure plate can be replaced with a spacing plate, (of any suitable shape) that is rigidly disposed onto the front surface of the plate 19 and extends forwardly thereof, where this spacing plate has a size and shape that also help to accurately position the plug assembly 10 within the drainpipe that is being tested as the plug assembly 10 is being rotated upward within the drainpipe's interior passageway. FIG. 17 illustrates a side plan view, in simplified form, of the just-described implementation of a front pressure plate 71 and a spacing plate 72 that is rigidly disposed onto the front surface of the plate 71 and extends forwardly thereof.

Referring again to FIGS. 1 and 2 and as will now be described in more detail, the aforementioned positioning arm assembly 12 is rotatably coupled to the rear portion 26 of the lever arm 11 and is adapted to releasably engage with this rear portion 26 and the bottom rim of the aforementioned opening (e.g., see FIGS. 14-16) that is formed in the drainpipe that is being tested in order to lock the Adjustable Drainpipe Test Plug Device 1 into its plugging position within the drainpipe. The positioning arm assembly 12 includes a pivot arm 35, a lock arm 28, and a pair of pivot-pins (7 and 34). The pivot arm 35 (and thus the entire positioning arm assembly 12) pivots on the axis of pivot pin 34, while the lock arm 28 pivots on the axis of pivot pin 7. The rear portion 26 of the lever arm 11 includes (e.g., defines) a longitudinal slot 24 that passes vertically through this rear portion 26 (e.g., the slot 24 passes from the top of the rear portion 26 to the bottom thereof), and also includes a depending stud 27 or the like that is rigidly disposed onto the bottom of the rear portion 26 between the slot 24 and the front portion 25 of the lever arm 11. The upper end of the pivot arm 35 is rotatably coupled to the depending stud 27 via pivot pin 34, thus allowing the pivot arm 35 to rotate in a vertical plane beneath the rear portion 26 of the lever arm 11. A foot 36, or other coupling means or member, is rigidly disposed onto an extensible rod 6 or the like. In turn, the extensible rod 6 is adjustably coupled to the lower end (e.g., the free end) of the pivot arm 35 via an adjustable coupling mechanism (e.g., a threaded rod, as illustrated by FIG. 1, or other adjustment mechanisms, as described in the following paragraph. In general, the extensible rod 6 is intended to encompass rods, shafts, bars, tubes or other similar extension.

In general, the adjustable coupling mechanism of the extensible rod 6 is applied to extend or retract a portion of that rod (and thus the relative position of the foot 36) relative to the lower end of the pivot arm 35 to improve engagement functionality of the Device 1 with respect to pipe walls of different thicknesses. Examples of such adjustable coupling mechanisms include, but are not limited to, threaded rods 8 (see FIG. 3), cam lock 8 type devices (see FIG. 4 and FIG. 5), threaded pins 9 (see FIG. 6 and FIG. 7) and/or cotter pins disposed within adjustment holes 82 in extensible rod 6, spring lock type mechanisms 83 (see FIG. 8), set screw type mechanisms 84 (see FIG. 9), snap lock type devices (not shown) or any other desired mechanism for extending rod 6 (with attached foot 36) relative to the pivot arm 35.

As will be appreciated from FIGS. 14-16, which are described in more detail hereafter, the foot 36 is dimensioned to support the Device 1 on the bottom rim of the opening that is formed in the drainpipe. In various implementations, the foot 36 may be formed in any desired shape, including the illustrated arcuate shape, so long as the shape of that foot can support the Device 1 on the bottom rim of the opening formed in the drainpipe, as described herein. The lower end of the lock arm 28 is rotatably coupled (via pivot pin 7) to a point on the pivot arm 35 that is between the foot 36 and the upper end of the pivot arm 35, thus allowing the lock arm 28 to rotate in a vertical plane above the pivot arm 35, where this point is sufficiently close to the upper end of the pivot arm 35 and the lock arm 28 is dimensioned so that the upper portion (e.g., the free end) of the lock arm 28 is able to slidably pass through and releasably engage with the slot 24 in a manner that is described in more detail hereafter. This rotatable coupling of the lock arm 28 and pivot arm 35 can optionally include a spring 31 that is disposed around the pivot arm 35 and the lock arm 28, and acts to bias the lock arm 28 upward toward the slot 24.

Referring again to FIG. 1, in various implementations of the Adjustable Drainpipe Test Plug Device 1, the front surface 33 of the upper portion of the lock arm 28 includes a spaced pair (or more) of notches therein, namely a leading lock notch 29 and a trailing lock notch 30. As will be appreciated from FIG. 1 in combination with FIG. 15 (which is described in more detail hereafter), the trailing lock notch 30 is dimensioned to releasably engage with the front surface 32 of the longitudinal slot 24 in the rear portion 26 of the lever arm 11 to hold the Device 1 in the aforementioned plugging position within the drainpipe that is being tested. As will be appreciated from FIG. 1 in combination with FIG. 16 (which is also described in more detail hereafter), the leading lock notch 29 is similarly dimensioned to releasably engage with the front surface 32 of the longitudinal slot 24 in the rear portion 26 of the lever arm 11 to hold/lock the Device 1 in the aforementioned test fluid bleeding position within the drainpipe. In another implementation (not shown) of the Adjustable Drainpipe Test Plug Device, the front surface 33 of the upper portion of the lock arm 28 includes just a single notch therein, namely the just-described trailing lock notch 30.

Figure 10:
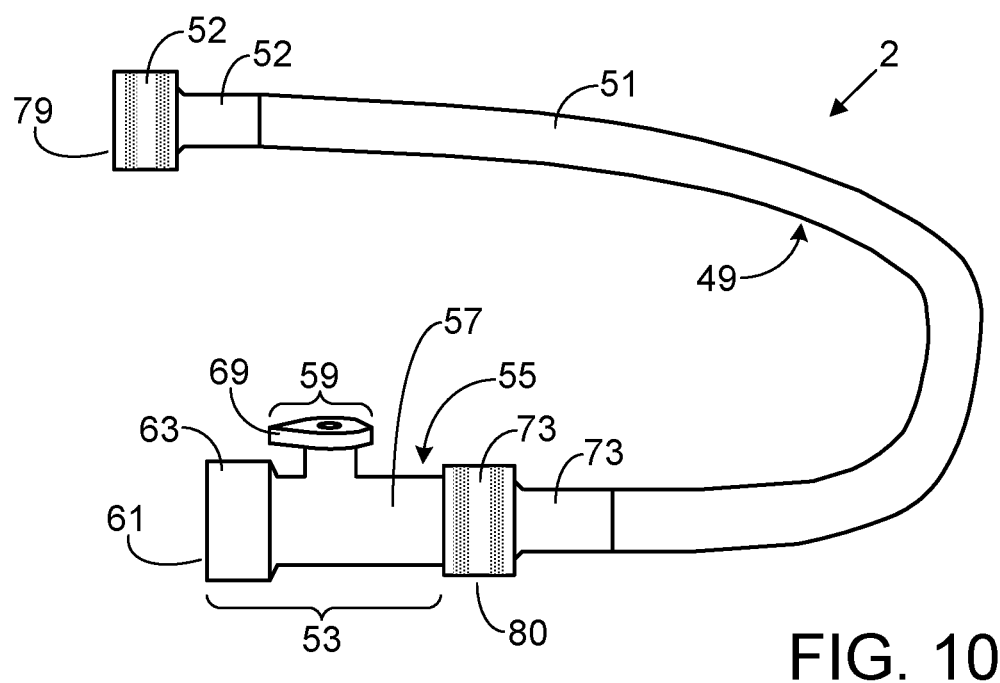
FIG. 10 is a diagram illustrating a plan view, in simplified form, of one implementation of an optional fluid fill hose that is sealably coupled to the Adjustable Drainpipe Test Plug Device of FIG. 1.

FIG. 10 illustrates a plan view, in simplified form, of one implementation of the optional fluid fill hose that is sealably coupled to the Adjustable Drainpipe Test Plug Device of FIG. 1. As exemplified in FIG. 10 and referring again to FIG. 1, this particular implementation of the fluid fill hose 2 may be used when the Adjustable Drainpipe Test Plug Device 1 includes the aforementioned fluid attachment nipple 48 and with hose connector 78 (or similar hose attachment mechanism). In various implementations, the fluid fill hose 2 includes one implementation of a tube assembly 49 and one implementation of a shut-off valve assembly 53. The outboard side 61 of the shut-off valve assembly 53 includes an attachment housing 63 to which a test fluid supply source (not shown) may be sealably coupled. In one version of the shut-off valve assembly 53 the attachment housing 63 forms a connector adapted (e.g., threaded or quick-release) that is designed to sealably connect to hose connector 78 of Device 1.

In various implementations, the inboard side 55 of the shut-off valve assembly 53 includes a valve attachment nipple 57 to which the inboard end 80 of the tube assembly 49 may be sealably coupled. In one version of the shut-off valve assembly 53 the interior or exterior surface of the inboard end of the nipple 57 is threaded to form a threaded female or male connector, respectively. In another version of the shut-off valve assembly 53 the inboard end of the nipple 57 forms a quick-disconnect type male or female connector. The shut-off valve assembly 53 also includes a valve portion 59 that is located between the attachment housing 63 and the nipple 57, where this valve portion 59 includes a valve control lever 69 or other valve actuating mechanism. The tube assembly 49 includes a tube 51 having a prescribed length and a pair of male or female connectors 52/73 (depending on the connection type of the nipple 57) that are securely and sealably coupled to the opposing ends of the tube 51. For example, in the aforementioned case where the exterior surface of the rear end 78 of the nipple 48 is threaded to form a threaded male connector, the interior surface of the female connector 52 is threaded to form a threaded female connector that is designed to sealably couple to this threaded male connector. In the aforementioned case where the rear end 78 of the nipple 48 forms a quick-disconnect type male connector, the interior surface of the female connector 52 forms a quick-disconnect type female connector that is designed to sealably couple to this quick-disconnect type male connector.

In the just-described case where the exterior surface of one end of the nipple 57 is threaded to form a threaded male connector, the interior surface of the female connector 73 is threaded to form a threaded female connector that is designed to sealably couple to this threaded male connector. In the just-described case where the nipple 57 forms a quick-disconnect type male connector, the interior surface of the female connector 73 forms a quick-disconnect type female connector that is designed to sealably couple to this quick-disconnect type male connector. It is noted that each of the just-described sealable couplings form a "water-tight" seal that is capable of maintaining any back pressure that is caused by the test fluid existing on the inboard side 55 of the shut-off valve assembly 53 (e.g., the aforementioned test fluid that is introduced into the drainpipe above the Device 1) without leakage. When the lever 69 is in an open position (e.g., the lever 69 position that is shown in FIG. 10), the test fluid that is supplied by the fluid supply source can freely and bidirectionally flow through the fluid fill hose 2 and the through-hole 37, and into the drainpipe above the plug 13. Whenever the lever 69 is in a closed position (e.g., the lever 69 is rotated 90 degrees from its position that is shown in FIG. 10), fluid flow through the fluid fill hose 2 and the through-hole 37 is prevented and any back pressure that is caused by the test fluid existing on the inboard side 55 of the shut-off valve assembly 53 (e.g., existing in the drainpipe above the plug 13) is maintained without leakage assuming there are no leaks in the drainpipe above the plug 13.

Figure 11:
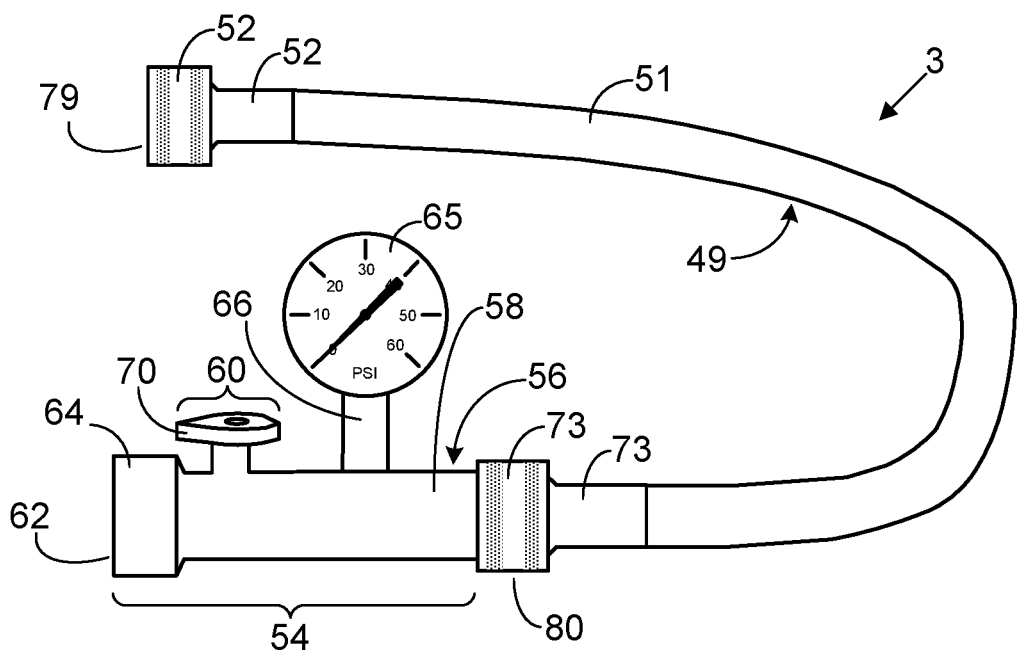
FIG. 11 is a diagram illustrating a plan view, in simplified form, of another implementation of an optional fluid fill hose that is sealably coupled to the Adjustable Drainpipe Test Plug Device of FIG. 1.

FIG. 11 illustrates a plan view, in simplified form, of another implementation of the fluid fill hose that is sealably coupled to the Adjustable Drainpipe Test Plug Device of FIG. 1. As exemplified in FIG. 11 and referring again to FIG. 1, this particular implementation of the fluid fill hose 3 may also be used when the Adjustable Drainpipe Test Plug Device 1 includes the fluid attachment nipple 48. The fluid fill hose 3 includes the just-described implementation of the tube assembly 49 and another implementation of a shut-off valve assembly 54. The outboard side 62 of the shut-off valve assembly 54 includes an attachment housing 64 to which a test fluid supply source (not shown) may be sealably coupled.

In one version of the shut-off valve assembly 54 the attachment housing 64 forms a female connector whose interior surface is threaded to form a threaded female connector that is designed to sealably couple to a test fluid supply source having a threaded male connector. In another version of the shut-off valve assembly 54 the attachment housing 64 forms a quick-disconnect type female connector that is designed to sealably couple to a test fluid supply source having a quick-disconnect type male connector. In various implementations, the inboard side 56 of the shut-off valve assembly 54 includes a valve attachment nipple 58 to which the inboard end 80 of the tube assembly 49 may be sealably coupled. In one version of the shut-off valve assembly 54 the exterior surface of one end of the nipple 58 is threaded to form a threaded male connector. In another version of the shut-off valve assembly 54 the nipple 58 forms a quick-disconnect type male connector. In the just-described case where the exterior surface of one end of the nipple 58 is threaded to form a threaded male connector, the interior surface of the female connector 73 is threaded to form a threaded female connector that is designed to sealably couple to this threaded male connector. Clearly, other water-tight connection mechanisms may be applied for this purpose without departing from the intended scope of the Adjustable Drainpipe Test Plug Device.

In the just-described case where the nipple 58 forms a quick-disconnect type male connector, the interior surface of the female connector 73 forms a quick-disconnect type female connector that is designed to sealably couple to this quick-disconnect type male connector. The shut-off valve assembly 54 also includes a valve portion 60 that is located between the attachment housing 64 and the nipple 58, where this valve portion 60 includes a valve control lever 70. The shut-off valve assembly 54 also includes a pressure gauge 65 that measures the pressure on the inboard side 56 of the valve portion 60. In other words, and as will be described in more detail hereafter, the pressure gauge 65 measures the back pressure caused by the test fluid that is being introduced via the fluid fill hose 3 into the drainpipe above the Device 1 whenever the lever 70 is in an open position (e.g., the lever 70 position that is shown in FIG. 11), and also measures the back pressure caused by the test fluid existing in the drainpipe above the Device 1 whenever the lever 70 is in the closed position. In an exemplary version of the shut-off valve assembly 54 the assembly 54 also includes an internally threaded gauge attachment port 66 that is located between the valve portion 60 and the nipple 58, and the pressure gauge 65 includes an externally threaded nipple (not shown) that is designed to sealably couple to this port 66. In tested implementations of the Adjustable Drainpipe Test Plug Device described herein the pressure gauge 65 was a conventional, heavy duty air/water pressure gauge having a 1-60 psi (pounds per square inch) pressure range with graduations at 2 pound increments.

It is noted that alternate implementations of the pressure gauge are also possible where the gauge has a pressure range that is either smaller or larger than 1-60 psi, and has graduations at increments that are either smaller or larger than 2 pounds. It is noted that each of the just-described sealable couplings forms a "water-tight" seal that is capable of maintaining any back pressure that is caused by the test fluid existing on the inboard side 56 of the shut-off valve assembly 54 (e.g., the test fluid that is introduced into the drainpipe above the Device 1) without leakage. Whenever the lever 70 is in the open position, the test fluid that is supplied by the fluid supply source can freely and bidirectionally flow through the fluid fill hose 2 and the through-hole 37, and into the drainpipe above the plug 13. Whenever the lever 70 is in a closed position (e.g., the lever 70 is rotated 90 degrees from its position that is shown in FIG. 11), fluid flow through the fluid fill hose 2 and the through-hole 37 is completely prevented and any back pressure that is caused by the test fluid existing on the inboard side 56 of the shut-off valve assembly 54 is maintained without leakage assuming there are no leaks in the drainpipe above the plug 13.

Figure 12:
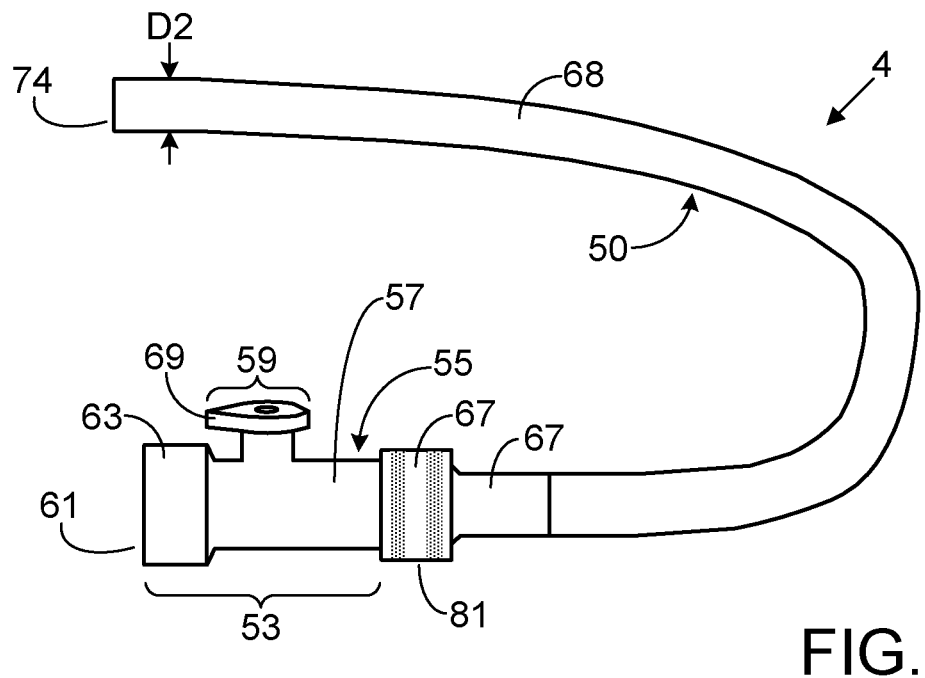
FIG. 12 is a diagram illustrating a plan view, in simplified form, of yet another implementation of an optional fluid fill hose that is sealably coupled to the Adjustable Drainpipe Test Plug Device of FIG. 1.

FIG. 12 illustrates a plan view, in simplified form, of yet another implementation of the fluid fill hose that is sealably coupled to the Adjustable Drainpipe Test Plug Device of FIG. 1. As exemplified in FIG. 12 and referring again to FIG. 1, this particular implementation of the fluid fill hose 4 may be used when the Adjustable Drainpipe Test Plug Device 1 does not include the fluid attachment nipple 48. The fluid fill hose 4 includes another implementation of a tube assembly 50 and the aforementioned implementation of the shut-off valve assembly 53. The tube assembly 50 includes a tube 68 having a prescribed length and a prescribed external diameter D2. The tube assembly 50 also includes a female connector 67 that is securely and sealably coupled to the inboard end 81 of the tube 68. In the aforementioned case where the exterior surface of one end of the nipple 57 of the shut-off valve assembly 53 is threaded to form a threaded male connector, the interior surface of the female connector 67 is threaded to form a threaded female connector that is designed to sealably couple to this threaded male connector.

In the aforementioned case where the nipple 57 forms a quick-disconnect type male connector, the interior surface of the female connector 67 forms a quick-disconnect type female connector that is designed to sealably couple to this quick-disconnect type male connector. The outboard end 74 of the tube assembly 50 (e.g., the outboard end 74 of the tube 68 that is opposite the female connector 67) is sealably coupled to the through-hole 37 by inserting this outboard end 74 a prescribed depth into the through-hole 37, where this insertion depth and the diameter D2 are selected such that the tube 68 forms a jam fit with the through-hole 37, and the strength of this jam-fit is sufficient to sealably couple the outboard end 74 of the tube 68 to the through-hole 37. It is noted that each of the just-described sealable couplings form a "water-tight" seal that is capable of maintaining any back pressure that is caused by the test fluid existing on the inboard side 55 of the shut-off valve assembly 53 without leakage.

When the lever 69 is in an open position (e.g., the lever 69 position that is shown in FIG. 5), the test fluid that is supplied by the fluid supply source can freely and bidirectionally flow through the fluid fill hose 2 and the through-hole 37, and into the drainpipe above the plug 13. Whenever the lever 69 is in a closed position (e.g., the lever 69 is rotated 90 degrees from its position that is shown in FIG. 5), fluid flow through the fluid fill hose 2 and the through-hole 37 is completely prevented and any back pressure that is caused by the test fluid existing on the inboard side 55 of the shut-off valve assembly 53 is maintained without leakage assuming there are no leaks in the drainpipe above the plug 13.

Figure 13:
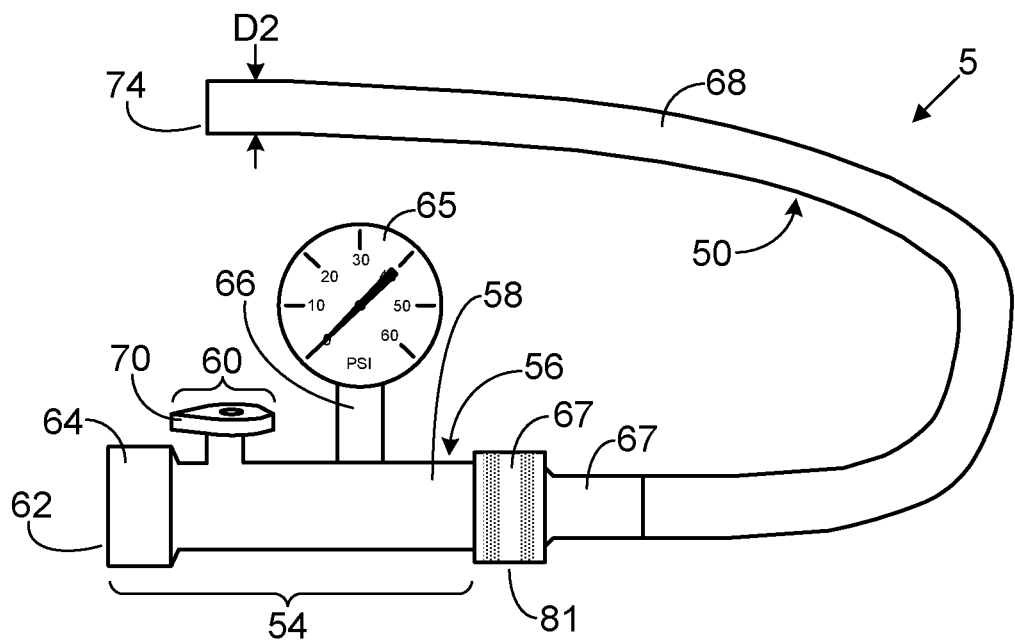
FIG. 13 is a diagram illustrating a plan view, in simplified form, of yet another implementation of an optional fluid fill hose that is sealably coupled to the Adjustable Drainpipe Test Plug Device of FIG. 1.

FIG. 13 illustrates a plan view, in simplified form, of yet another implementation of the fluid fill hose that is sealably coupled to the Adjustable Drainpipe Test Plug Device of FIG. 1. As exemplified in FIG. 13 and referring again to FIG. 1, this particular implementation of the fluid fill hose 5 may also be used when the Adjustable Drainpipe Test Plug Device 1 does not include the fluid attachment nipple 48. The fluid fill hose 5 includes the just-described implementation of the tube assembly 50 and the aforementioned implementation of the shut-off valve assembly 54. In the aforementioned case where the exterior surface of one end of the nipple 58 of the shut-off vale assembly 54 is threaded to form a threaded male connector, the interior surface of the female connector 67 is threaded to form a threaded female connector that is designed to sealably couple to this threaded male connector. In the aforementioned case where the nipple 58 forms a quick-disconnect type male connector, the interior surface of the female connector 67 forms a quick-disconnect type female connector that is designed to sealably couple to this quick-disconnect type male connector.

It is noted that each of the just-described sealable couplings form a "water-tight" seal that is capable of maintaining any back pressure that is caused by the test fluid existing on the inboard side 56 of the shut-off valve assembly 54 without leakage. As will be described in more detail hereafter, the pressure gauge 65 of the shut-off valve assembly 54 measures the back pressure caused by the test fluid that is being introduced via the fluid fill hose 5 into the Adjustable Drainpipe Test Plug Device 1 whenever the lever 70 is in an open position (e.g., the lever 70 position that is shown in FIG. 13), and also measures the back pressure caused by the test fluid existing in the drainpipe above the Device 1 when the lever 70 is in the closed position. Whenever the lever 70 is in the open position, the test fluid that is supplied by the fluid supply source can freely and bidirectionally flow through the fluid fill hose 2 and the through-hole 37, and into the drainpipe above the plug 13. When the lever 70 is in a closed position (e.g., the lever 70 is rotated 90 degrees from its position that is shown in FIG. 13), fluid flow through the fluid fill hose 2 and the through-hole 37 is completely prevented and any back pressure that is caused by the test fluid existing on the inboard side 56 of the shut-off valve assembly 54 is maintained without leakage assuming there are no leaks in the drainpipe above the plug 13.

FIG. 14 illustrates a partially-cross-sectional side plan view, in simplified form, of the Adjustable Drainpipe Test Plug Device 1 configured without the optional fluid fill hose while it is being inserted into a drainpipe 38 through an opening 41 that is formed in the drainpipe 38. FIG. 15 illustrates a partially-cross-sectional side plan view, in simplified form, of the Device 1 configured without the optional fluid fill hose while it is fully seated and locked into a plugging position within the drainpipe 38, and after a test fluid 40 has been introduced into the drainpipe 38 above the Device 1, so that the Device 1 is completely plugging the drainpipe 38 immediately above the opening 41 and temporarily preventing the test fluid 40 from flowing beyond the Device 1. It is noted that the optional fluid fill hose implementations described herein are not shown in FIG. 14 or 15 for the sake of being able to better visualize the Adjustable Drainpipe Test Plug Device 1 within the drainpipe 38.

As exemplified in FIG. 14 and referring again to FIG. 1, the opening 41 in the drainpipe 38 is formed on one side thereof by a drain clean-out port 42 (or other opening mechanism) that is fitted into the drainpipe 38 and from which a cap (not shown) has been temporarily removed, resulting in the opening 41 having a top rim 43 and a bottom rim 44. A user can insert the Adjustable Drainpipe Test Plug Device 1 through the opening 41 and into a passageway 39 inside the drainpipe 38 by holding the rear end (e.g., the free end) of the rear portion 26 of the lever arm 11. As the user pushes the rear portion 26 of the lever arm 11 in a downward direction (e.g., direction indicated by arrow 75) the foot 36 on the pivot arm 35 will seat on the bottom rim 44 of the clean-out port 42, and the plug seal assembly 10 will be rotated progressively upward in the passageway 39. After the foot 36 has seated on the bottom rim 44, and as the user continues to push the rear portion 26 of the lever arm 11 in the downward direction 75, the lock arm 28 will be rotated progressively upward into and through the longitudinal slot 24 in the lever arm 11 until the lock arm 28 reaches the position shown in FIG. 15 where the aforementioned trailing lock notch 30 in the lock arm 28 engages with the front surface 32 of the slot 24, thus fully seating the plug 13 within the drainpipe 38 and holding/locking the plug 13 in the plugging position within the drainpipe 38. As will be appreciated from the foregoing and the more detailed description of FIG. 16 that follows, the aforementioned spring 31 operates in combination with the lock arm 28 to forcibly hold the plug 13 in the plugging position until such time as the user pushes the lever arm 11 slightly downward (e.g., direction indicated by arrow 76) to allow the lock notch 30 to disengage from the front surface 32 of the slot 24.

As exemplified in FIG. 15 and referring again to FIG. 1, when the plug 13 is fully seated and held/locked in the plugging position within the drainpipe 38 the plug 13 mechanical seals the drainpipe 38 and prevents any test fluid 40 that has been introduced into the drainpipe 38 above the plug 13 from flowing beyond the plug 13 or out of the opening 41. It will be appreciated that when the plug seal assembly 10 is in the plugging position the pressure that is applied to the front pressure plate 19 and the planar front surface 16 of the plug 13 by the test fluid 40 will compress the plug 13 against the rear pressure plate 20 and the front portion 25 of the lever arm 11, thus causing a corresponding radial expansion of the plug 13 which inherently increases the force that plug 13 applies to the interior wall of the drainpipe 38 and enhances the mechanical seal created by the plug 13.

FIG. 16 illustrates a partially-cross-sectional side plan view, in simplified form, of the Adjustable Drainpipe Test Plug Device 1 configured without its fluid fill hose while it is locked into a test fluid bleeding position within the drainpipe 38, so that the Device 1 is allowing the test fluid 40 to slowly flow past the Device 1 and drain out of the drainpipe 38 after the testing thereof is completed without the test fluid 40 flowing or splashing out of the opening 41. It is noted that the optional fluid fill hose implementations described herein are not shown in FIG. 16 for the sake of being able to better visualize the Adjustable Drainpipe Test Plug Device 1 within the drainpipe 38. As exemplified in FIG. 16 and referring again to FIG. 1, after the testing of the drainpipe 38 has been completed the user can push the rear portion 26 of the lever arm 11 slightly downward (e.g., direction indicated by arrow 76) to allow the trailing lock notch 30 in the lock arm 28 to disengage from the front surface 32 of the slot 24 in the lever arm 11, thus unseating the plug 13 within the drainpipe 38. In the case where the lock arm 28 includes the leading lock notch 29, the user can then push the rear portion 26 of the lever arm 11 in an upward direction (e.g., direction indicated by arrow 77) until the leading lock notch 29 engages with the front surface 32 of the slot 24, thus holding/locking the plug 13 in the test fluid bleeding position within the drainpipe 38.

As exemplified in FIG. 16, when the plug 13 is held/locked in the test fluid bleeding position the leading/top end 14 of the annular rim 18 of the plug 13 still seals off the side 47 of the drainpipe 38 having the opening 41, but the trailing/bottom end 15 of the plug's rim 18 has been rotated away from the opposite side 46 of the drainpipe 38 to which the trailing/bottom end 15 was previously sealed. It will be appreciated that during this rotation the arcuate spacing hoop 21 serves to cam the trailing/bottom end 15 away from the side 46 of the drainpipe 48 while maintaining the leading/top end's 14 contact with the side 47 of the drainpipe 38. Thus, when the plug 13 is in the test fluid bleeding position a fluid drain gap 45 is formed between the plug 13 and the side 46 of the drainpipe 38 that is opposite the opening 41, where this gap 45 allows the test fluid 40 to flow past the plug 13 and run down the side 46 of the drainpipe 38 that is opposite the opening 41 without the test fluid 40 flowing or splashing out of the opening 41.

Referring again to FIGS. 10-16 and as will be appreciated from the more detailed description that follows, in addition to positioning the plug 13 into the test fluid bleeding position shown in FIG. 16 in order to drain the test fluid 40 that was introduced into the drainpipe 38, the optional fluid fill hose (e.g., 2, 3, 4 or 5 as illustrated by FIGS. 10-13) may also be used to drain the test fluid 40 out of the drainpipe 38 in a safe and controlled manner while the plug 13 is positioned in the plugging position shown in FIG. 15. After the test fluid 40 has been completely drained from the drainpipe 38, the user can push the rear portion 26 of the lever arm 11 slightly downward (e.g., direction indicated by arrows 75 and 76 in FIGS. 14-16) to allow both the trailing and leading lock notches 30 and 29 in the lock arm 28 to disengage from the front surface 32 of the slot 24 in the lever arm 11. The user can then push the rear portion 26 of the lever arm 11 in an upward direction (e.g., direction indicated by arrow 77) until the lock arm 28 slides completely out of the slot 24 as shown in FIG. 14, and withdraw the Adjustable Drainpipe Test Plug Device from the drainpipe 38 and the opening 41.

As described heretofore, the Adjustable Drainpipe Test Plug Device implementations described herein can be easily and inexpensively fabricated using a variety of inexpensive but durable materials. For example and referring again to FIG. 1, the plug 13 can be made from (e.g., formed of) any of a variety of durable, elastomeric (e.g., resiliently flexible), self-supporting materials that are designed to seat fully and securely within the interior wall of a drainpipe to form a mechanical seal therein that is capable of plugging the drainpipe when it is exposed to a wide range of pressures caused by either a test fluid or gas that is introduced into the drainpipe above the plug 13. Examples of such materials include, but are not limited to, rubber, plastic, silicon compounds, etc. The spacing hoop 21 or plate, the front pressure plate 19, the rear pressure plate 20, the lever arm 11, the pivot arm 35, and the lock arm 28 can be made from any of a variety of durable, rigid or semi-rigid materials such as steel (among other types of metals), ceramic, high-density polymers, fiber-reinforced composite materials, etc. The optional connectors 52/73/67 and the shut-off valve assembly 53/54 can be made of any of a variety of durable, rigid materials such as brass and/or steel (among other types of metals), fiber-reinforced composite materials, etc. In tested implementations of the Adjustable Drainpipe Test Plug Device described herein the shut-off valve assembly 53/54 was a conventional, commercial quality, one-piece, forged brass shut-off valve having an internal steel ball (not shown) providing a secure closed position.

Referring again to FIGS. 1 and 10-13, the length of the tube assembly 49/50 is chosen such that the optional fluid fill hose 2/3/4/5 extends out of the drainpipe and the opening formed therein a distance that is sufficient to make the shut-off valve assembly 53/54 readily accessible by a user at a safe and comfortable distance from the drainpipe whenever the Adjustable Drainpipe Test Plug Device 1 is fully seated and locked into the plugging position within the drainpipe. For example, in tested implementations of the Adjustable Drainpipe Test Plug Device described herein the tube assembly 49/50 was a heavy-duty water-fill hose rated for a 150 psi working pressure, and having a length on the order of about 13.5 inches (34.29 centimeters) and one or two stamped steel female hose fittings (e.g., connectors 52/73/67) equipped with heavy-duty brass crimped couplings. The tube 51/68 of this water-fill hose had an external diameter D2 of ⅜ inch (0.95 centimeters) and was made of commercial grade rubber. It is noted that other configurations of the tube assembly 49/50 are also possible. For example, the tube assembly 49/50 can have any other length that allows the user to be at a safe and comfortable distance from the drainpipe whenever the Adjustable Drainpipe Test Plug Device 1 is fully seated and locked into the plugging position within the drainpipe. The tube assembly 49/50 can also have a working pressure rating that is less than or greater than 150 psi. The tube 51/68 can be made of various materials other than rubber, and can also have any external diameter D2 less than or greater than ⅜ inch (0.95 centimeters). The tube assembly 49/50 can also be constructed using conventional PVC (polyvinyl chloride) tubing components, fiber-reinforced composite materials, or any other suitable material.

FIG. 18 illustrates an exemplary implementation, in simplified form, of a method for testing a drainpipe using one or more of the Adjustable Drainpipe Test Plug Device implementations described herein. Furthermore, while the method of FIG. 18 may illustrate various implementations of the Adjustable Drainpipe Test Plug Device, this figure is not intended to provide exhaustive or complete illustrations or descriptions of every possible implementation of the Adjustable Drainpipe Test Plug Device as described throughout this document. In addition, any boxes and/or interconnections between boxes that may be represented by broken or dashed lines in FIG. 18 represent alternate or optional implementations of the Adjustable Drainpipe Test Plug Device described herein. As such, any or all of these alternate or optional implementations, as described below, may be used in combination with some or all of the other implementations that are described throughout this document.

As exemplified by FIG. 18, an exemplary method for use of the Adjustable Drainpipe Test Plug Device begins by adjusting (action 100) a length (i.e., extending or retracting) of the extensible rod of the positioning arm based on the nominal wall thickness of the pipe being tested. In general, as the nominal wall thickness increases, the diameter of the pipe opening decreases. As such, the length of the extensible rod used to releasably engage with the bottom rim of the side opening of the drainpipe will be decreased. Conversely, as the nominal wall thickness decreases, the length of the extensible rod used to releasably engage with the bottom rim of the side opening of the drainpipe will be increased. Once the extensible rod has been adjusted to the desired length, the method continues by inserting (action 101) the Adjustable Drainpipe Test Plug Device into the drainpipe via the opening that is formed therein or that is otherwise attached or integral to the pipe. In other words, the Adjustable Drainpipe Test Plug Device is inserted into the interior passageway of the drainpipe via the opening. The Adjustable Drainpipe Test Plug Device is then locked (action 102) into the plugging position within the drainpipe, thus causing the plug assembly of the Adjustable Drainpipe Test Plug Device to mechanically seal the drainpipe. After the Adjustable Drainpipe Test Plug Device has been locked into a plugging position as described above, the Device may then optionally be used for pressure testing of the pipe, if desired.

For example, when pressure testing the pipe, in various implementations, a test fluid supply source is sealably coupled (action 104) to the outboard side of the shut-off valve assembly on the fluid fill hose of the Adjustable Drainpipe Test Plug Device. The valve control lever or actuator on the valve portion of the shut-off valve assembly is then turned to its open position, thus allowing the test fluid that is supplied by the test fluid supply source to flow through the fluid fill hose and the through-hole in the plug of the Adjustable Drainpipe Test Plug Device, and into the drainpipe above the plug (action 106). It will be appreciated that this introduction of test fluid into the drainpipe serves to pressurize it, where the amount of back pressure existing at the plug of the Adjustable Drainpipe Test Plug Device is directly based on the amount of test fluid that exists in the drainpipe above the plug (e.g., the weight and height of the test fluid existing in the drainpipe above the Adjustable Drainpipe Test Plug Device creates a predictable back pressure on its plug, and thus within the fluid fill hose of the Adjustable Drainpipe Test Plug Device and the portion of the drainpipe that is filled with the test fluid). For example, a conventional drainpipe spanning three building stories and filled with water would produce a pressure reading of about 15-17 pounds per square inch gage (psig) in a gauge measuring the pressure in the drainpipe that is located at the bottom of the drainpipe. A determination is then made as to whether or not the desired amount of the test fluid has flowed into the drainpipe above the plug of the Adjustable Drainpipe Test Plug Device (action 108). Various ways of making this determination are described in more detail hereafter.

Referring again to FIG. 18, whenever the desired amount of the test fluid has flowed into the drainpipe above the plug of the Adjustable Drainpipe Test Plug Device, the valve control lever or actuator may be turned to its closed position (action 110), thus stopping the flow of the test fluid into the drainpipe. Closing this valve also serves to prevent the test fluid existing within the drainpipe from leaking out of the drainpipe via the fluid fill hose, while also serving to pressurize the drainpipe above the plug due to the back pressure caused by the test fluid existing within the drainpipe. The test fluid supply source can then optionally be uncoupled from the shut-off valve assembly on the fluid fill hose of the Adjustable Drainpipe Test Plug Device (action 112). The pressurized drainpipe may then be then monitored for leaks for a prescribed amount of time (action 114). This monitoring can be performed in various ways that will be described in more detail hereafter. Whenever the optional monitoring of the pressurized drainpipe (action 114) has been completed, the test fluid may be drained from the drainpipe (action 116). This this draining can be performed in various ways that will also be described in more detail hereafter. The Adjustable Drainpipe Test Plug Device is then withdrawn from the drainpipe and the opening that is formed therein (action 118).

Referring again to FIG. 18, it is noted that the amount of test fluid which is allowed to flow into the drainpipe above the plug of the Adjustable Drainpipe Test Plug Device in actions 106/108 and the type of pressurized drainpipe monitoring that is performed in action 114 will vary based the application (e.g., based on the characteristics of the particular drainpipe that is being tested and the associated building (or other type of facility) in which the drainpipe is installed, and the characteristics of the particular Adjustable Drainpipe Test Plug Device that is being used for the drainpipe testing). Exemplary applications will now be described in more detail.

In one application of the Adjustable Drainpipe Test Plug Device implementations described herein, assume a first exemplary case where the fluid fill hose does not include the aforementioned pressure gauge (e.g., the fluid fill hose 2 shown in FIG. 10 and the fluid fill hose 4 shown in FIG. 12), and the opening formed in the drainpipe is located near the connection of the building's drainpipe system to the sewer system. In this first exemplary case, the test fluid being introduced into the drainpipe above the plug via the fluid fill hose will be allowed to flow into the drainpipe until the entire drainpipe above the plug is filled to the top of the building where the top of the drainpipe vents to the atmosphere. In this first exemplary case, action 108 can involve observing the top of the building where the top of the drainpipe vents to the atmosphere until the test fluid is visible at the top of the drainpipe. Similarly, action 114 can involve simply monitoring the top of the drainpipe to look for a decrease in the level of the test fluid in the drainpipe, which would indicate the presence of a leak somewhere in the drainpipe between the top of the drainpipe and the position within the drainpipe where the Adjustable Drainpipe Test Plug Device is located.

As described heretofore, the Adjustable Drainpipe Test Plug Device implementations can form and maintain a mechanical seal in a drainpipe for long periods of time when exposed to a wide range of pressures in the drainpipe. By way of example but not limitation, in tested implementations of the Adjustable Drainpipe Test Plug Device the Device was capable of forming a seal in a given drainpipe that could maintain (e.g., withstand) a back pressure of up to at least 100 psi, which is approximately equivalent to the back pressure produced at the base of a drainpipe in a twenty-story building (e.g. a building having twenty different floors) that is completely filled to its top with water.

As is appreciated in the art of plumbing systems, local building codes require a given building's drainpipe system to withstand a pressure of 15-17 psi for 24 hours. This 15-17 psi pressure is approximately equivalent to the back pressure produced at the base of a three-story drainpipe that is completely filled to its top with water. Thus, in another application of the Adjustable Drainpipe Test Plug Device implementations described herein where the fluid fill hose does not include the pressure gauge, and an opening in the building's drainpipe system is available on each story (or at least each third story) of the building which is commonly the case, each three-story section of the building's drainpipe system can be tested separately as described with respect to a second exemplary case. For example, in this second exemplary case, referring again to FIG. 18, actions 100, 102, 104 and 106 may be performed on a desired story A of the building. Action 108 may then be performed on another story B of that same building, with story B being three stories above story A. Actions 110 and 112 may then be performed on story A. Action 114 may then be performed on story B. Actions 116 and 118 may then be performed on story A.

Given the foregoing description of the Adjustable Drainpipe Test Plug Device implementations described herein and the exemplary applications thereof, and referring again to FIG. 18, it is noted that it can be inconvenient to perform actions 100/102/104/106 on one story A of a building whose drainpipe is being tested, and then perform action 108 on another story B of the building that is higher that story A (whether story B is the next floor above story A, or three floors above story A, or on the roof of the building, as the case may be), and then perform actions 110/112 back on story A, and then perform action 114 back on story B, and then perform actions 116/118 back on story A. This inconvenience is eliminated in the Adjustable Drainpipe Test Plug Device implementations where the fluid fill hose includes the pressure gauge (e.g., the fluid fill hose 3 shown in FIG. 11 and the fluid fill hose 5 shown in FIG. 13) since actions 100-118 can all be performed on the same story of the building where the opening is formed in the drainpipe.

More particularly, in these pressure gauge implementations, action 108 can be performed by monitoring the pressure gauge until a pressure reading corresponding to the desired amount of test fluid (i.e., the amount of test fluid required to fill the drainpipe above the plug of the Adjustable Drainpipe Test Plug Device up to the desired height as explained heretofore) is displayed on the gauge. Action 114 can also be performed by monitoring the pressure gauge for the prescribed amount of time to look for a decrease in the pressure reading that is displayed on the gauge, which would indicate the presence of a leak somewhere in the drainpipe above the plug of the Adjustable Drainpipe Test Plug Device. Referring again to FIGS. 4, 6 and 7-9, it is evident that being able to perform actions 108 and 114 at the drainpipe opening 41 using the pressure gauge 65 affords a significant degree of convenience since the gauge 65 is readily accessible to the user and they do not have to move back and forth between different stories/floors of the building in order to complete the testing of the drainpipe as described heretofore. Thus, the addition of the pressure gauge to the Adjustable Drainpipe Test Plug Device advantageously saves the user time and effort.

As described heretofore and referring again to FIGS. 1, 11, 13 and 14-16, the weight of the test fluid 40 existing in the drainpipe 38 above the Adjustable Drainpipe Test Plug Device 1 creates a predictable back pressure on the plug 13, and thus within the fluid fill hose 3/5 of the Device 1. Thus, for any height of the test fluid 40 in the drainpipe 38 above the plug 13, a correlatable back pressure will be exerted on the plug 13 and within the fluid fill hose 3/5. Given this fact, in the aforementioned case where the entire drainpipe 38 above the plug 13 is filled to the top of the building with the test fluid 40 introduced via the fluid fill hose 3/5, the pressure reading on the pressure gauge 65 that is obtained in actions 108 and 114 is a direct measure of the back pressure being exerted on the plug 13 by the test fluid 40, and this pressure reading can also be used to determine the height of the drainpipe 38 that exists above the plug 13.

Referring again to FIG. 18, it is further noted that the draining of the test fluid from the drainpipe (action 116) can be realized in various ways examples of which will now be described in more detail. In one implementation of the Adjustable Drainpipe Test Plug Device described herein, the test fluid can be drained from the drainpipe simply by performing action 118. In another implementation of the Adjustable Drainpipe Test Plug Device where the lock arm of the Adjustable Drainpipe Test Plug Device includes the aforementioned leading lock notch, the test fluid can be drained from the drainpipe by unlocking the Adjustable Drainpipe Test Plug Device from the plugging position within the drainpipe, and then locking the Device into the test fluid bleeding position within the drainpipe which breaks the mechanical seal within the drainpipe as described heretofore and allows the test fluid existing within the drainpipe to flow past the trailing/bottom end of the plug and into the sewer system without the test fluid flowing or splashing out of the opening.

In yet another implementation of the Adjustable Drainpipe Test Plug Device the test fluid can be drained from the drainpipe by uncoupling the test fluid supply source from the shut-off valve assembly, and then turning the valve control lever or actuator on the valve portion of the shut-off valve assembly to its open position while the Device remains in the plugging position within the drainpipe, thus allowing the test fluid to drain out of the drainpipe via the fluid fill hose. This particular implementation advantageously provides another safe, convenient and controlled way to drain the test fluid out of the drainpipe in the case where the drainpipe-to-sewer-system connection has not yet been completed since the outboard side of the shut-off valve assembly can be placed directly into the sewer system connection or some other place that can accommodate the fluid being drained from the drainpipe, or another hose can be sealably coupled to the outboard side of the shut-off valve assembly and the other end of this other hose can be placed directly into the sewer system connection or the just-described other place.

It is yet further noted that while the foregoing method for testing a drainpipe employs a test fluid, it is also possible to employ a prescribed test gas (such as air or any other desired type of gas) for the drainpipe testing. In this case the top of the drainpipe can be capped off to make the portion of the drainpipe between the cap and the plug of the Adjustable Drainpipe Test Plug Device air-tight (assuming there are no leaks in this portion), and the pressure gauge of the Adjustable Drainpipe Test Plug Device will be one that can measure air/gas pressure. The drainpipe testing method will generally be the same as that shown in FIG. 18, except that the test fluid supply source is replaced with an air/gas supply source, and the drainpipe is pressurized to a desired pressure using the air/gas that is introduced via the fluid fill hose into the drainpipe above the plug.

3.0 Other Implementations:

While the Adjustable Drainpipe Test Plug Device has been described by specific reference to implementations thereof, it is understood that variations and modifications thereof can be made without departing from the true spirit and intended scope of the Device. By way of example but not limitation, while the foregoing description of the Adjustable Drainpipe Test Plug Device implementations included certain elements involving male or female connectors, it should be recognized that the Adjustable Drainpipe Test Plug Device implementations are not limited to these specific connectors. For example, the male connectors described herein could just as well be female connectors, and their counterpart female connectors could correspondingly be male connectors. Furthermore, one or more coupled pairs of the connectors described herein may be eliminated completely such that the interface between the components that are coupled by each pair of connectors is made continuous. Furthermore, while the foregoing description of the Adjustable Drainpipe Test Plug Device implementations described shut-off valve assemblies having a particular type of valve, it should be recognized that any valve that allows fluid to flow in and out when the valve is in an open position, and is capable of preventing fluid flow when the valve is in a closed position and is exposed to the various pressures describe heretofore, may be employed. By way of example but not limitation, the valve may be a manually-operated ball-type valve as described heretofore. The valve may also be any other type of manually-operated valve. The valve may also be a solenoid-activated valve or any other type of mechanical or automated valve. It should also be recognized that the interface between the various components of the Adjustable Drainpipe Test Plug Device implementations can employ alternate conventional joining methods where appropriate, such as via bolts, welds, rivets, adhesives, or screws, among other types of joining methods.

It is noted that any or all of the implementations that are described in the present document and any or all of the implementations that are illustrated in the accompanying drawings may be used and thus claimed in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

The aforementioned implementations have been described with respect to interaction between several components. It will be appreciated that such implementations and components can include those components or specified sub-components, some of the specified components or sub-components, and/or additional components, and according to various permutations and combinations of the foregoing. Sub-components can also be implemented as components coupled to other components rather than included within parent components (e.g., hierarchical components).

Wherefore, what is claimed is:

1. A device for releasably plugging a drainpipe via an opening formed therein, comprising:
   a lever arm comprising a front portion and a rear portion;
   a plug seal assembly that is securely coupled to the front portion of the lever arm, the plug seal assembly comprising a plug that is adapted to mechanically seal the drainpipe whenever the device is locked into a plugging position within the drainpipe,
   a positioning arm assembly that is rotatably coupled to the rear portion of the lever arm;
   a lock arm that is rotatably coupled to the positioning arm assembly, the lock arm being adapted to releasably engage with the rear portion of the lever arm thereby holding the positioning arm assembly in a fixed position relative to the rear portion of the lever arm;
   an extensible rod that is adjustably coupled to the positioning arm assembly; and
   a foot coupled to the extensible rod, the foot being is adapted to engage a bottom rim of the opening in order to lock the device into the plugging position when the lock arm is concurrently releasably engaged with the rear portion of the lever arm.

2. The device of claim 1, wherein the plug comprises:
   a front surface;
   a rear surface; and
   a peripheral annular rim between the front surface and the rear surface, the annular rim comprising a leading/top end and a trailing/bottom end.

3. The device of claim 2, wherein the plug seal assembly further comprises:
   a front pressure plate disposed onto the front surface of the plug; and
   a rear pressure plate disposed onto the rear surface of the plug, and
   wherein the secure coupling of the plug seal assembly to the front portion of the lever arm is accomplished via a plurality of fasteners;
   the fasteners passing through the front pressure plate, through the plug, through the rear pressure plate and through the front portion of the lever arm, thereby securely coupling the front and rear pressure plates and the plug to the front portion of lever arm.

4. The device of claim 1, further comprising a longitudinal slot that passes vertically through the rear portion of the lever arm;
   wherein the rotational coupling of the positioning arm assembly to the rear portion of the lever arm enables the positioning arm assembly to rotate in a vertical plane beneath the rear portion of the lever arm;
   wherein the rotational coupling of the lock arm to the positioning arm assembly enables the lock arm assembly to rotate relative to the positioning arm in the vertical plane beneath the rear portion of the lever arm; and
   wherein the lock arm comprises at least one lock notch, each lock notch adapted to pass through the longitudinal slot and releasably engage a front surface of the longitudinal slot in response to corresponding rotations of the positioning arm assembly and the lock arm, thereby causing the foot to engage the bottom rim of the opening to lock the device into the plugging position.

5. The device of claim 4, wherein a front surface of the upper portion of the lock arm comprises a trailing lock notch that is dimensioned to releasably engage with the front surface of the slot in order to lock the device into a full plugging position.

6. The device of claim 4, wherein the front surface of the upper portion of the lock arm further comprises a leading lock notch that is dimensioned to releasably engage with the front surface of the slot in order to lock the device into a partial plugging position within the drainpipe.

7. The device of claim 1, the plug further comprising a through-hole that passes from a front side of the plug seal assembly to a rear side thereof.

8. The device of claim 7, further comprising a fluid fill hose, one end of which is sealably coupled to the through-hole.

9. The device of claim 8, wherein:
   a rear side of the through-hole comprises a fluid attachment nipple;
   the fluid fill hose comprises a tube assembly and a shut-off valve assembly;
   the shut-off valve assembly comprises a valve portion that is located between an outboard side of the shut-off valve assembly and an inboard side thereof;
   the outboard side of the shut-off valve assembly comprises an attachment housing to which a test fluid supply source is sealably coupled;
   the inboard side of the shut-off valve assembly comprises a valve attachment nipple to which an inboard end of the tube assembly is sealably coupled; and
   the sealable coupling of one end of the fluid fill hose to the through-hole comprises an outboard end of the tube assembly being sealably coupled to the fluid attachment nipple.

10. The device of claim 9, wherein placing the valve in an open condition causes test fluid supplied by the test fluid supply source to flow through the fluid fill hose and the through-hole, and into the drainpipe above the plug.

11. The device of claim 9, wherein placing the valve in a closed condition prevents fluid flow through the fluid fill hose and the through-hole, and generates back pressure in the drainpipe via test fluid in the drainpipe above the plug.

12. The device of claim 9 wherein the shut-off valve assembly further comprises a pressure gauge for measuring back pressure in the drainpipe caused by fluid above the plug.

13. The device of claim 8, wherein:
the fluid fill hose comprises a tube assembly and a shut-off valve assembly;
the tube assembly comprises a tube having a prescribed external diameter D2;
the shut-off valve assembly comprises a valve portion that is located between an outboard side of the shut-off valve assembly and an inboard side thereof;
the outboard side of the shut-off valve assembly comprises an attachment housing to which a test fluid supply source is sealably coupled;
the inboard side of the shut-off valve assembly comprises a valve attachment nipple to which an inboard end of the tube assembly is sealably coupled; and
the sealable coupling of one end of the fluid fill hose to the through-hole comprises an outboard end of the tube being sealably coupled to the through-hole by inserting said outboard end a prescribed depth into the through-hole, said insertion depth and diameter D2 being selected such that the tube forms a jam fit with the through-hole, said jam fit having a strength that is sufficient to sealably couple the outboard end of the tube to the through-hole.

14. The device of claim 13, wherein placing the valve in an open condition causes test fluid supplied by the test fluid supply source to flow through the fluid fill hose and the through-hole, and into the drainpipe above the plug.

15. The device of claim 13, wherein placing the valve in a closed condition prevents fluid flow through the fluid fill hose and the through-hole, and generates back pressure in the drainpipe via test fluid in the drainpipe above the plug.

16. The device of claim 13, wherein the shut-off valve assembly further comprises a pressure gauge for measuring back pressure in the drainpipe caused by fluid above the plug.

17. A device for releasably plugging a drainpipe via an opening formed therein, comprising:
a lever arm comprising a front portion and a rear portion the lever arm, the rear portion of the lever arm including a longitudinal slot that passes vertically through the rear portion of the lever arm;
a plug seal assembly that is securely coupled to the front portion of the lever arm, the plug seal assembly comprising a plug that is adapted to mechanically seal the drainpipe whenever the device is locked into a plugging position within the drainpipe,
a positioning arm assembly that is rotatably coupled to the rear portion of the lever arm, this rotational coupling enabling the positioning arm to rotate relative to the rear portion of the lever arm in a vertical plane beneath the rear portion of the lever arm;
a lock arm that is rotatably coupled to the positioning arm assembly, this rotational coupling enabling the lock arm assembly to rotate relative to the positioning arm in the vertical plane beneath the rear portion of the lever arm;
the lock arm including at least one lock notch, each lock notch adapted to pass through the longitudinal slot and releasably engage a front surface of the longitudinal slot in response to corresponding rotations of the positioning arm assembly and the lock arm thereby releasably engaging the positioning arm assembly in a fixed position relative to the rear portion of the lever arm;
an extensible rod that is adjustably coupled to the positioning arm assembly; and
a foot coupled to the extensible rod, the foot being is adapted to engage a bottom rim of the opening in order to lock the device into the plugging position when one of the plurality of notches of the lock arm is concurrently releasably engaged with the rear portion of the lever arm.

18. A method for plugging a drainpipe, the method comprising the actions of:
adjusting a length of an extensible rod of a positioning arm of an adjustable drainpipe test plug device,
the length of the extensible rod being adjusted to correspond to a nominal wall thickness of an opening of the drainpipe being plugged,
the adjustable drainpipe test plug device comprising a plug assembly adapted to mechanically seal the drainpipe whenever the adjustable drainpipe test plug device is locked into a full plugging position within the drainpipe;
inserting the adjustable drainpipe test plug device into the drainpipe via the opening; and
locking the adjustable drainpipe test plug device into the full plugging position within drainpipe, thereby causing the plug assembly of the adjustable drainpipe test plug device to mechanically seal the drainpipe.

19. The method of claim 18 further comprising the actions of:
sealably coupling a test fluid supply to a fluid fill hose of the plugging device; and
when the adjustable drainpipe test plug device is locked into the plugging position, generating a back pressure in the drainpipe be introducing test fluid into the drainpipe via the fluid fill hose.

20. The method of claim 19 further comprising the actions of relieving back pressure in the drainpipe by opening a valve sealably coupled to the fluid fill hose to drain at least a portion of the test fluid in the drainpipe.

21. The method of claim 19 further comprising the actions of relieving back pressure in the drainpipe by:
unlocking the plugging device from the full plugging position; and
locking the plugging device into a partial plugging position within the drainpipe to drain at least a portion of the test fluid in the drainpipe by allowing that fluid to flow past a portion of the plug assembly.

* * * * *